(12) United States Patent
Liu

(10) Patent No.: US 12,554,100 B2
(45) Date of Patent: Feb. 17, 2026

(54) IMAGING LENS

(71) Applicant: GUANGZHOU LUXVISIONS INNOVATION TECHNOLOGY LIMITED, Guangzhou (CN)

(72) Inventor: Yi-Wei Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 304 days.

(21) Appl. No.: 18/402,592

(22) Filed: Jan. 2, 2024

(65) Prior Publication Data
US 2024/0377615 A1    Nov. 14, 2024

(30) Foreign Application Priority Data
May 9, 2023   (CN) .......................... 202310517030.9

(51) Int. Cl.
*G02B 9/64*   (2006.01)
(52) U.S. Cl.
CPC ...................................... *G02B 9/64* (2013.01)

(58) Field of Classification Search
CPC .... G02B 9/64; G02B 13/0045; G02B 13/006; G02B 13/18
USPC ......................................................... 359/755
See application file for complete search history.

(56) References Cited

U.S. PATENT DOCUMENTS

| | | | |
|---|---|---|---|
| 2002/0048092 A1* | 4/2002 | Yoneyama | G02B 13/02 359/748 |
| 2008/0106799 A1* | 5/2008 | Ohashi | G02B 15/143507 359/689 |
| 2008/0252996 A1* | 10/2008 | Kato | G02B 15/144111 359/747 |

* cited by examiner

*Primary Examiner* — Mohammed A Hasan
(74) *Attorney, Agent, or Firm* — JCIPRNET

(57) ABSTRACT

An imaging lens, sequentially including a first lens element to a seventh lens element from an object side to an image side along an optical axis, is provided. The first lens element has positive refracting power. The second lens element has negative refracting power. The third lens element and the fourth lens element form a cemented lens element, and the cemented lens element has positive refracting power. The fifth lens element has positive refracting power. The sixth lens element has positive refracting power. The seventh lens element has negative refracting power.

11 Claims, 19 Drawing Sheets

IMAGING LENS

CROSS-REFERENCE TO RELATED APPLICATION

This application claims the priority benefit of China application serial no. 202310517030.9, filed on May 9, 2023. The entirety of the above-mentioned patent application is hereby incorporated by reference herein and made a part of this specification.

BACKGROUND

Technical Field

The disclosure relates to an optical element, and in particular to an imaging lens.

Description of Related Art

The specifications of the electronic device are changing with each passing day, and the optical imaging lens as one of the key components is also developing in more diversified ways. The imaging lens of the electronic device not only requires a larger aperture and a shorter system length, but also pursues higher pixels and higher resolutions. Sequentially to meet various design requirements, the imaging lens often includes multiple lens elements, and the assembly tolerance between the lens elements becomes an important topic.

SUMMARY

The disclosure provides an imaging lens, which includes a cemented lens element and can reduce the influence of assembly tolerance and improve the production yield.

According to an embodiment of the disclosure, an imaging lens is provided, which sequentially includes a first lens element to a seventh lens element from an object side to an image side along an optical axis. The first lens element has positive refracting power. The second lens element has negative refracting power. The third lens element and the fourth lens element form a cemented lens element, and the cemented lens element has positive refracting power. The fifth lens element has positive refracting power. The sixth lens element has positive refracting power. The seventh lens element has negative refracting power. The imaging lens satisfies a conditional expression:

$$-7.07 < \frac{(L2R1) \times (L2R2)}{L2R2 - L2R1} < -5.52$$

where L2R1 is a radius of curvature of an object side surface of the second lens element in an optical axis region, and L2R2 is a radius of curvature of an image side surface of the second lens element in an optical axis region.

Based on the above, the imaging lens provided by the embodiment of the disclosure includes the cemented lens element formed by the third lens element and the fourth lens element, which can prevent the assembly tolerance between the two lens elements caused by adopting the separate third lens element and fourth lens element, and the imaging lens can have good imaging quality.

In order to make the above features and advantages of the disclosure more obvious and understandable, embodiments are given below and described in detail with reference to the drawings.

DESCRIPTION OF THE EMBODIMENTS

Figure 1A:
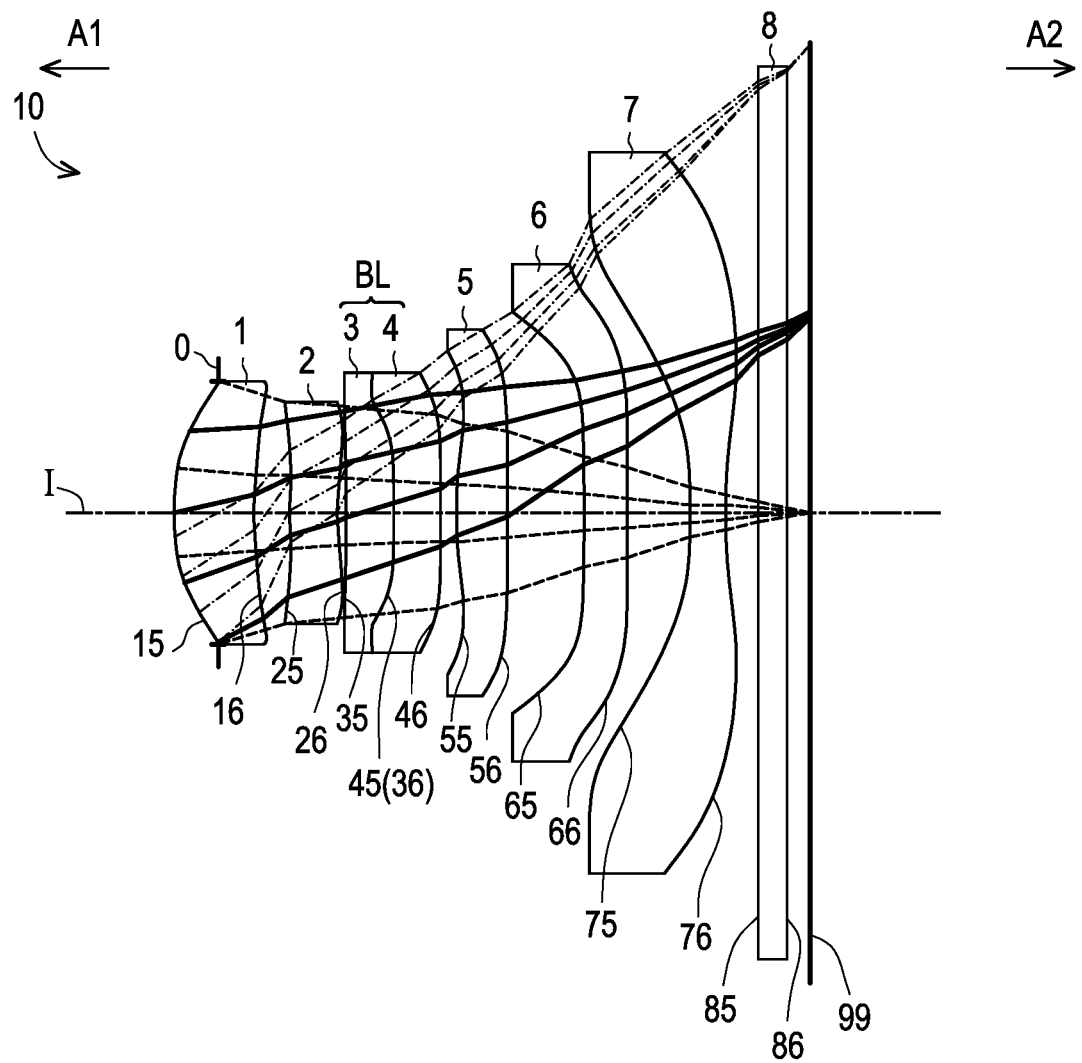
FIG. 1A is a schematic diagram of an imaging lens according to a first embodiment of the disclosure.

Please refer to FIG. 1A, which is a schematic diagram of an imaging lens according to a first embodiment of the disclosure. An imaging lens 10 according to the first embodiment of the disclosure sequentially includes an aperture 0, a first lens element 1, a second lens element 2, a third lens element 3, a fourth lens element 4, a fifth lens element 5, a sixth lens element 6, a seventh lens element 7, and a filter 8 from an object side A1 to an image side A2 along an optical axis I of the imaging lens 10. When light rays emitted by an object to be captured enters the imaging lens 10 and sequentially passes through the aperture 0, the first lens element 1, the second lens element 2, the third lens element 3, the fourth lens element 4, the fifth lens element 5, the sixth lens element 6, the seventh lens element 7, and the filter 8, an image is formed on an image plane 99. The filter 8 is, for example, an infrared cut-off filter, which may allow light with an appropriate wavelength (for example, infrared or visible light) to pass through and filter out an infrared band that is to be filtered. The filter 8 is disposed between the seventh lens element 7 and the image plane 99. It should be added that the object side A1 is a side facing the object to be captured, and the image side A2 is a side facing the image plane 99.

In the embodiment, the first lens element 1, the second lens element 2, the third lens element 3, the fourth lens element 4, the fifth lens element 5, the sixth lens element 6, the seventh lens element 7, and the filter 8 of the optical imaging lens 10 respectively have object side surfaces 15, 25, 35, 45, 55, 65, 75, and 85 facing the object side A1 and allowing imaging light to pass through and image side surfaces 16, 26, 36, 46, 56, 66, 76, and 86 facing the image side A2 and allowing the imaging light to pass through, wherein the third lens element 3 and the fourth lens element 4 are cemented together through the image side surface 36 of the former and the object side surface 45 of the latter to form a cemented lens element BL, thus preventing the assembly tolerance between the two lens elements caused by adopting the separate third lens element 3 and fourth lens element 4. In the embodiment, the aperture 0 is disposed on the object side A1 of the first lens element 1.

The first lens element 1 has positive refracting power, an optical axis region of the object side surface 15 is convex, an optical axis region of the image side surface 16 is concave, and the object side surface 15 and the image side surface 16 are both aspheric surfaces. The second lens element 2 has negative refracting power, an optical axis region of the object side surface 25 is convex, an optical axis region of the image side surface 26 is concave, and the object side surface 25 and the image side surface 26 are both aspheric surfaces. An optical axis region of the object side surface 35 of the third lens element 3 is convex and an aspheric surface. An optical axis region of the object side surface 45 of the fourth lens element 4 is concave, an optical axis region of the image side surface 46 is concave, and the object side surface 45 and the image side surface 46 are both aspheric surfaces. The cemented lens element BL formed by cementing the third lens element 3 and the fourth lens element 4 has positive refracting power. The fifth lens element 5 has positive refracting power, an optical axis region of the object side surface 55 is convex, an optical axis region of the image side surface 56 is concave, and the object side surface 55 and the image side surface 56 are both aspheric surfaces. The sixth lens element 6 has positive refracting power, an optical axis region of the object side surface 65 is convex, an optical axis region of the image side surface 66 is concave, and the object side surface 65 and the image side surface 66 are both aspheric surfaces. The seventh lens element 7 has negative refracting power, an optical axis region of the object side surface 75 is concave, an optical axis region of the image side surface 76 is concave, and the object side surface 75 and the image side surface 76 are both aspheric surfaces. A refractive index Nd of the fourth lens element 4 is 1.64, and an Abbe number is 21.

Other detailed optical data according to the first embodiment are shown in Table 1. The full field of view of the optical imaging lens 10 is 85°, the aperture value (F-number) is 1.880, the effective focal length (EFL) is 3.385 mm, and the optical imaging lens 10 satisfies a conditional expression:

$$\frac{TTL}{2ImgH} = 0.670$$

where TTL is a distance from the object side surface 15 of the first lens element 1 to the image plane 99 on the optical axis I, and ImgH is half of a diagonal length of an effective pixel region on the image plane 99, that is, an image height.

TABLE 1

| Element | Surface | Radius of curvature (mm) | Spacing (mm) | Refractive index | Abbe number |
|---|---|---|---|---|---|
| First lens element 1 | Object side surface 15 | 1.473 | 0.550 | 1.55 | 55.9 |
| | Image side surface 16 | 3.622 | 0.237 | | |
| Second lens element 2 | Object side surface 25 | 20.671 | 0.340 | 1.66 | 20.4 |
| | Image side surface 26 | 4.763 | 0.049 | | |
| Third lens element 3 | Object side surface 35 | 11.978 | 0.332 | 1.61 | 55 |
| Fourth lens element 4 | Object side surface 45 | −3.154 | 0.318 | 1.64 | 21 |
| | Image side surface 46 | 244.292 | 0.107 | | |
| Fifth lens element 5 | Object side surface 55 | 2.748 | 0.334 | 1.63 | 30.7 |
| | Image side surface 56 | 140.007 | 0.528 | | |
| Sixth lens element 6 | Object side surface 65 | 10.080 | 0.291 | 1.55 | 55.9 |
| | Image side surface 66 | 15.166 | 0.433 | | |
| Seventh lens element 7 | Object side surface 75 | −3.612 | 0.232 | 1.55 | 55.9 |
| | Image side surface 76 | 3.070 | 0.219 | | |

TABLE 1-continued

| Element | Surface | Radius of curvature (mm) | Spacing (mm) | Refractive index | Abbe number |
|---|---|---|---|---|---|
| Filter 8 | Object side surface 85 | Infinity | 0.210 | 1.52 | 64 |
|  | Image side surface 86 | Infinity | 0.150 |  |  |
|  | Image plane 99 | Infinity | 0.000 |  |  |

In Table 1, the spacing of the object side surface 15 (0.550 mm as shown in Table 1) is the thickness of the first lens element 1 on the optical axis I, the spacing of the image side surface 16 (0.237 mm as shown in Table 1) is the distance between the image side surface 16 of the first lens element 1 and the object side surface 25 of the second lens element 2 on the optical axis I, that is, a gap between the first lens element 1 and the second lens element 2 on the optical axis I, and so on.

In the embodiment, the object side surfaces 15, 25, 35, 45, 55, 65, and 75 and the image side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7 are all aspheric surfaces. The aspheric surfaces are defined according to Formula (1) below:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

Y: distance between a point on an aspheric curve and the optical axis;
Z: aspheric depth, that is, a vertical distance between a point on an aspheric surface that is Y from the optical axis and a tangent plane tangent to the vertex of the aspheric surface on the optical axis;
R: radius of curvature of a lens element surface;
K: conic constant;
$a_{2i}$: 2i-th order aspheric surface coefficient.

The conic constant K and various aspheric surface coefficients of the above aspheric surfaces in Formula (1) of the embodiment are as shown in Table 2. The number 15 in Table 2 represents the aspheric surface coefficient of the object side surface 15 of the first lens element 1, and the other numbers may be deduced by analogy. Since the third lens element 3 and the fourth lens element 4 are cemented together through the image side surface 36 of the former and the object side surface 45 of the latter, only the object side surface 45 of the fourth lens element 4 is shown in Table 2.

TABLE 2

| Surface | K | $a_2$ | $a_4$ | $a_6$ | $a_8$ |
|---|---|---|---|---|---|
| 15 | −0.022 | 0.000E+00 | 0.000E+00 | 4.696E−02 | −1.126E−01 |
| 16 | −17.778 | 0.000E+00 | 0.000E+00 | −1.175E−01 | 4.192E−01 |
| 25 | 0.000 | 0.000E+00 | 0.000E+00 | 1.353E−01 | −4.073E−01 |
| 26 | 0.000 | 0.000E+00 | 0.000E+00 | 1.384E−01 | −2.632E−01 |
| 35 | 114.149 | 0.000E+00 | 0.000E+00 | 1.488E−01 | −3.953E−01 |
| 45 | 3.520 | 0.000E+00 | 0.000E+00 | 3.834E−02 | −2.767E−01 |
| 46 | 0.000 | 0.000E+00 | 0.000E+00 | 2.583E−01 | −1.035E−01 |
| 55 | −29.801 | 0.000E+00 | 0.000E+00 | 1.421E−02 | −1.454E−03 |
| 56 | 0.000 | 0.000E+00 | 0.000E+00 | −2.088E−02 | 1.260E−02 |
| 65 | 0.000 | 0.000E+00 | 0.000E+00 | 6.150E−03 | 1.857E−05 |

TABLE 2-continued

| 66 | −202.535 | 0.000E+00 | 0.000E+00 | −2.812E−02 | 1.241E−02 |
| 75 | −0.474 | 0.000E+00 | 0.000E+00 | 4.644E−02 | −1.262E−02 |
| 76 | −0.675 | 0.000E+00 | 0.000E+00 | 4.074E−02 | −6.711E−03 |

| Surface | $a_{10}$ | $a_{12}$ | $a_{14}$ | $a_{16}$ | $a_{18}$ |
|---|---|---|---|---|---|
| 15 | 1.856E−01 | −6.571 | 0.000E+00 | −2.154E−02 | −1.428E−02 |
| 16 | −8.905E−01 | 5.481 | 0.000E+00 | 1.535E−02 | −2.238E−01 |
| 25 | 7.060E−01 | 7.412 | 0.000E+00 | −1.899E−01 | −2.037E−01 |
| 26 | 1.443E−01 | 1.753 | 0.000E+00 | −3.062E−01 | −5.640E−01 |
| 35 | 4.346E−01 | −3.089 | 0.000E+00 | −1.339E−01 | −2.216E−02 |
| 45 | 6.194E−01 | 1.389 | 0.000E+00 | −1.286E+00 | −1.018E+00 |
| 46 | −1.477E−01 | 7.841 | 0.000E+00 | −4.890E−02 | 6.893E−03 |
| 55 | −1.289E−02 | 2.519 | 0.000E+00 | 4.020E−04 | 1.004E−03 |
| 56 | −2.482E−03 | −5.507 | 0.000E+00 | −2.722E−04 | −7.339E−05 |
| 65 | −7.679E−03 | −1.02 | 0.000E+00 | −5.544E−05 | 2.393E−05 |
| 66 | −1.750E−03 | 2.914 | 0.000E+00 | −7.291E−05 | 8.864E−06 |
| 75 | 5.846E−03 | −1.615 | 0.000E+00 | 2.658E−05 | −2.251E−06 |
| 76 | −2.301E−04 | −3.630 | 0.000E+00 | 1.651E−06 | −2.372E−08 |

| Surface | $a_{20}$ | $a_{22}$ | $a_{24}$ | $a_{26}$ | $a_{28}$ |
|---|---|---|---|---|---|
| 15 | 8.867E−02 | 0.000E+00 | −6.571 | 0.000E+00 | 0.000E+00 |
| 16 | −3.987E−02 | 0.000E+00 | 5.481 | 0.000E+00 | 0.000E+00 |
| 25 | −1.598E−01 | 0.000E+00 | 7.412 | 0.000E+00 | 0.000E+00 |
| 26 | −6.904E−01 | 0.000E+00 | 1.753 | 0.000E+00 | 0.000E+00 |
| 35 | 4.687E−03 | 0.000E+00 | −3.089 | 0.000E+00 | 0.000E+00 |
| 45 | 2.226E+00 | 0.000E+00 | 1.389 | 0.000E+00 | 0.000E+00 |
| 46 | 3.185E−03 | 0.000E+00 | 7.841 | 0.000E+00 | 0.000E+00 |
| 55 | 6.960E−04 | 0.000E+00 | 2.519 | 0.000E+00 | −5.471E−05 |
| 56 | −4.053E−05 | 0.000E+00 | −5.507 | 0.000E+00 | 4.345E−06 |
| 65 | 1.047E−05 | 0.000E+00 | −1.02 | 0.000E+00 | −1.305E−06 |
| 66 | 2.048E−07 | 0.000E+00 | 2.914 | 0.000E+00 | −6.120E−11 |
| 75 | 3.146E−08 | 0.000E+00 | −1.615 | 0.000E+00 | 2.054E−11 |
| 76 | −5.778E−10 | 0.000E+00 | −3.630 | 0.000E+00 | 3.015E−13 |

Figure 1B:
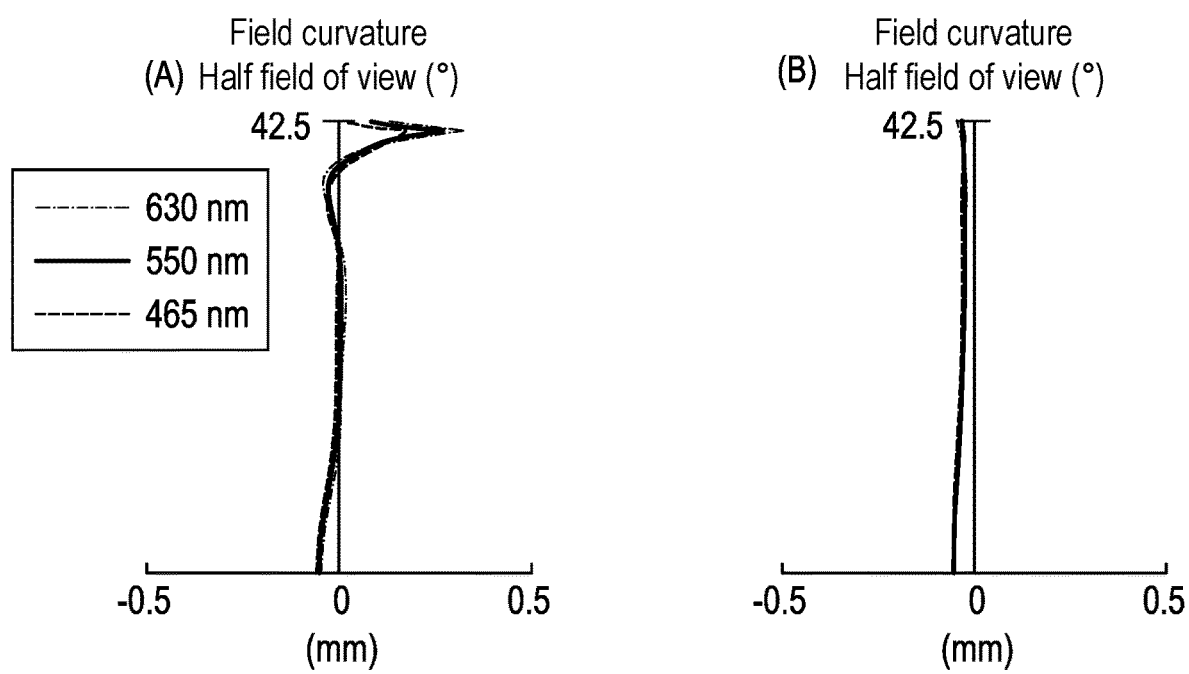
FIG. 1B is a schematic diagram of field curvature of the imaging lens according to the first embodiment.
Figure 1C:
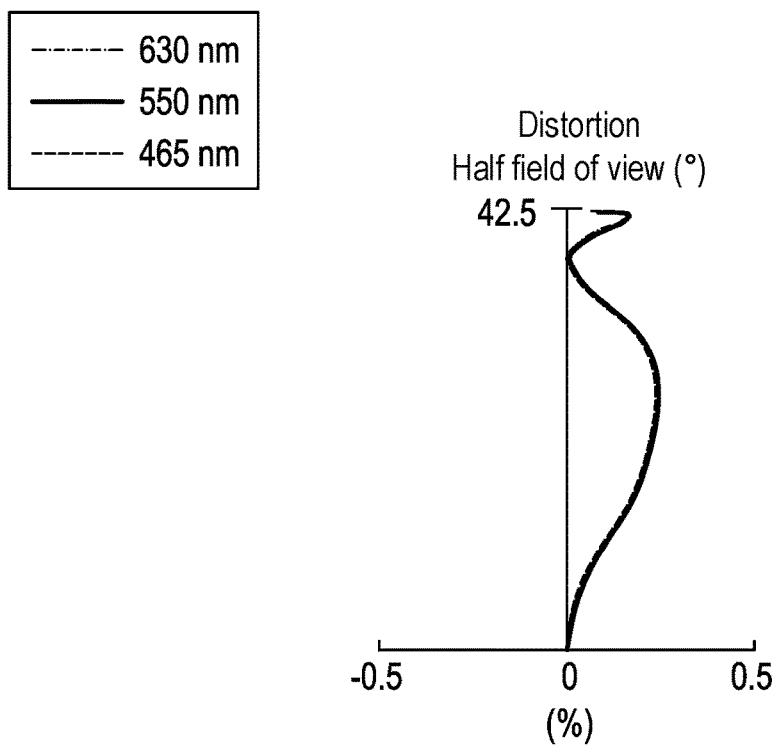
FIG. 1C is a schematic diagram of distortion of the imaging lens according to the first embodiment.
Figure 1D:
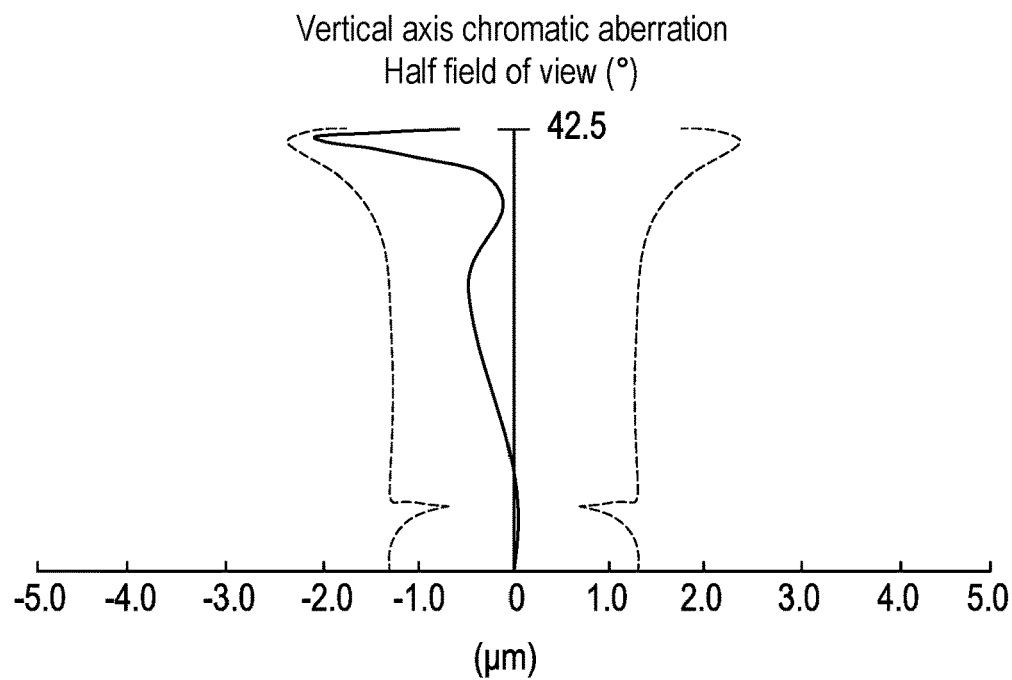
FIG. 1D is a schematic diagram of vertical axis chromatic aberration of the imaging lens according to the first embodiment.
Figure 1E:
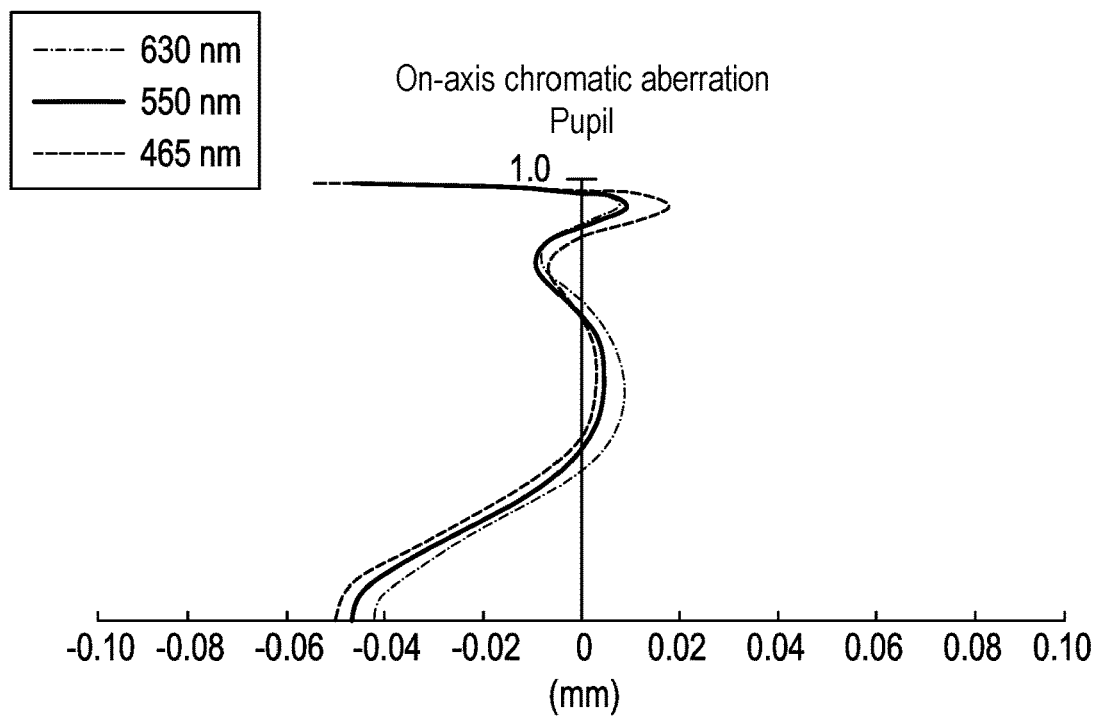
FIG. 1E is a schematic diagram of on-axis chromatic aberration of the imaging lens according to the first embodiment.

Please refer again to FIG. 1B to FIG. 1F. FIG. 1B is a schematic diagram of field curvature of the imaging lens according to the first embodiment, wherein part (A) of FIG. 1B is the tangential direction, and part (B) of FIG. 1B is the sagittal direction. FIG. 1C is a schematic diagram of distortion of the imaging lens according to the first embodiment, FIG. 1D is a schematic diagram of vertical axis chromatic aberration of the imaging lens according to the first embodiment, FIG. 1E is a schematic diagram of on-axis chromatic aberration of the imaging lens according to the first embodiment, and FIG. 1F is a schematic diagram of a modulation transfer function of the imaging lens according to the first embodiment.

As shown in FIG. 1B, when different color lights with wavelengths of 465 nm, 550 nm, and 630 nm are respectively incident on the imaging lens 10, the field curvatures of each color light at different field angles all fall within the range of ±0.40 mm. The distortion aberration diagram of FIG. 1C shows that the distortion aberration of the imaging lens 10 is maintained within the range of ±3%. FIG. 1D shows that when different color lights with wavelengths of 465 nm, 550 nm, and 630 nm are respectively incident on the imaging lens 10, the position of the 550 nm color light is used as the reference zero point on the image plane 99 perpendicular to the optical axis I, and the positional difference between the 465 nm color light and the 630 nm color light is compared, the schematic diagram of vertical axis chromatic aberration as shown in FIG. 1D is shown, it can be seen that the vertical axis chromatic aberrations of the imaging lens 10 at different field angles all fall within a diffraction limit (shown as dashed lines in FIG. 1D) and fall within the range of ±3.0 μm. Please refer to FIG. 1E. When different color lights with wavelengths of 465 nm, 550 nm, and 630 nm are respectively incident on the imaging lens 10, the imaging positions on the optical axis I are different along with different aperture angles to form on-axis chromatic aberration, and the on-axis chromatic aberrations of the various color lights all fall within the range of ±0.06 mm.

Figure 1F:
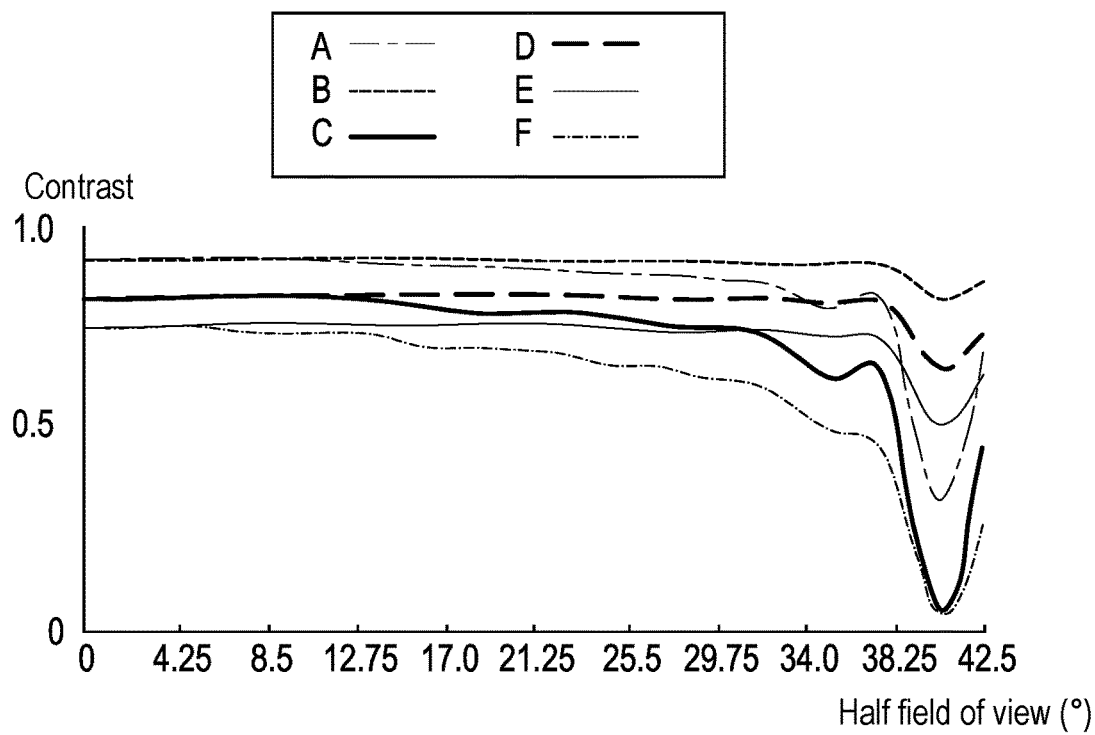
FIG. 1F is a schematic diagram of a modulation transfer function (MTF) of the imaging lens according to the first embodiment.

Refer to FIG. 1F. In FIG. 1F, a curve A represents the radius value of 50 lp/mm (sagittal), a curve B represents the tangent value of 50 lp/mm (tangential), a curve C represents the radius value of 100 lp/mm, a curve D represents the tangent value of 100 lp/mm, a curve E represents the radius value of 150 lp/mm, and a curve F represents the tangent value of 150 lp/mm. As shown in FIG. 1F, when the resolving power of the imaging lens 10 is respectively tested using lines with spatial frequencies of 50 lp/mm, 100 lp/mm, and 150 lp/mm, the imaging lens 10 has good resolving power at least within the half field of view of 38.25°, which means that the imaging lens 10 has high restoration ability. FIG. 1B to FIG. 1F illustrate that the imaging lens 10 according to the first embodiment of the disclosure as shown in FIG. 1A has good imaging quality.

In order to fully explain various embodiments of the disclosure, other embodiments of the disclosure are described below. It must be noted here that the following embodiments continue to use the reference numerals and some content of the above embodiment, wherein the same reference numerals are adopted to represent the same or similar elements, and the description of the same technical content is omitted. For the description of the omitted part, reference may be made to the above embodiment and will not be repeated in the following embodiments.

Figure 2A:
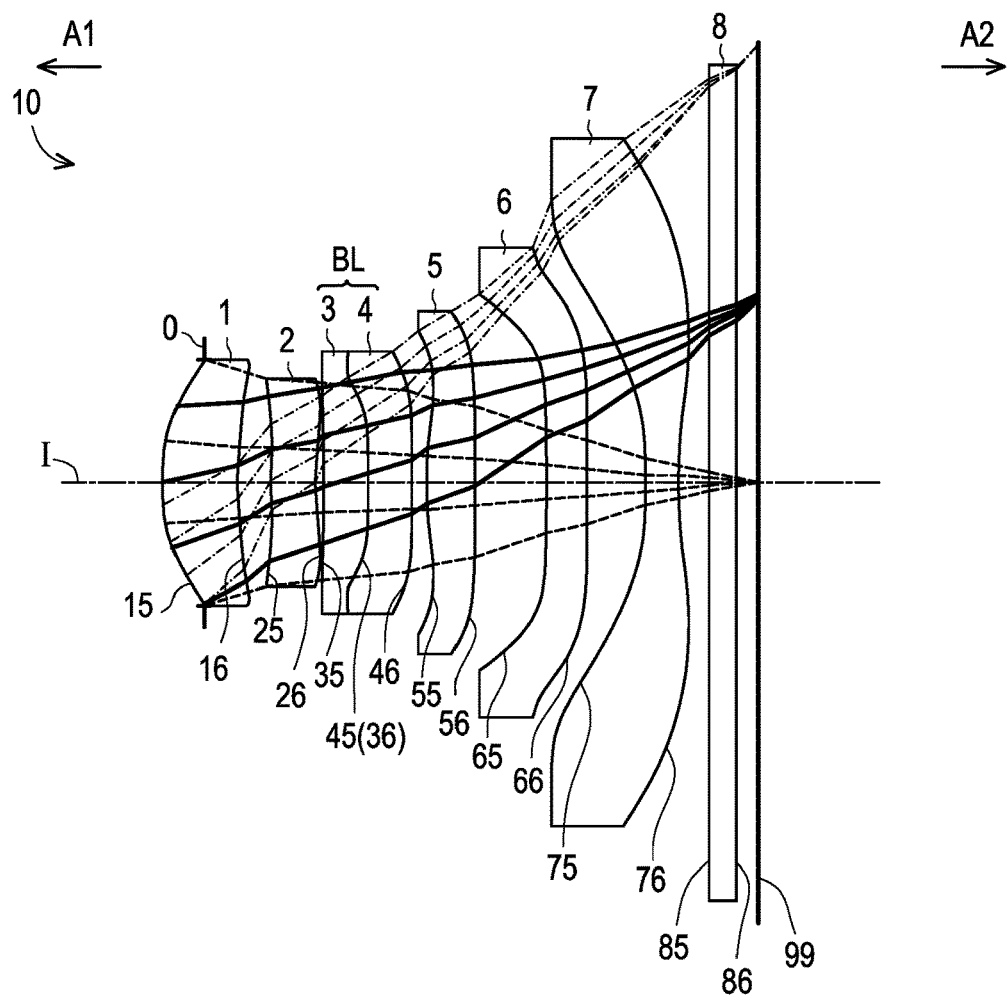
FIG. 2A is a schematic diagram of an imaging lens according to a second embodiment of the disclosure.

Please refer to FIG. 2A, which shows a schematic diagram of an imaging lens according to a second embodiment of the disclosure. An imaging lens 10 according to the second embodiment of the disclosure sequentially includes an aperture 0, a first lens element 1, a second lens element 2, a third lens element 3, a fourth lens element 4, a fifth lens element 5, a sixth lens element 6, a seventh lens element 7, and a filter 8 from an object side A1 to an image side A2 along an optical axis I of the imaging lens 10. When light rays emitted by an object to be captured enters the imaging lens 10 and sequentially passes through the aperture 0, the first lens element 1, the second lens element 2, the third lens element 3, the fourth lens element 4, the fifth lens element 5, the sixth lens element 6, the seventh lens element 7, and the filter 8, an image is formed on an image plane 99. In the embodiment, the aperture 0 is disposed on the object side A1 of the first lens element 1.

The first lens element 1 has positive refracting power, an optical axis region of an object side surface 15 is convex, an optical axis region of an image side surface 16 is concave, and the object side surface 15 and the image side surface 16 are both aspheric surfaces. The second lens element 2 has negative refracting power, an optical axis region of an object side surface 25 is convex, an optical axis region of an image side surface 26 is concave, and the object side surface 25 and the image side surface 26 are both aspheric surfaces. An optical axis region of an object side surface 35 of the third lens element 3 is convex and is an aspheric surface. An optical axis region of an object side surface 45 of the fourth lens element 4 is concave, and an optical axis region of an image side surface 46 is concave, and the object side surface 45 and the image side surface 46 are both aspheric surfaces. A cemented lens element BL formed by cementing the third lens element 3 and the fourth lens element 4 has positive refracting power. The fifth lens element 5 has positive refracting power, an optical axis region of an object side surface 55 is convex, an optical axis region of an image side surface 56 is concave, and the object side surface 55 and the image side surface 56 are both aspheric surfaces. The sixth lens element 6 has positive refracting power, an optical axis region of an object side surface 65 is convex, an optical axis region of an image side surface 66 is concave, and the object side surface 65 and the image side surface 66 are both aspheric surfaces. The seventh lens element 7 has negative refracting power, an optical axis region of an object side surface 75 is concave, an optical axis region of an image side surface 76 is concave, and the object side surface 75 and the image side surface 76 are both aspheric surfaces. A refractive index Nd of the fourth lens element 4 is 1.67, and an Abbe number is 19.5.

Other detailed optical data according to the second embodiment are shown in Table 3. The full field of view of the optical imaging lens 10 is 85°, the aperture value (F-number) is 1.880, the effective focal length (EFL) is 3.393 mm, and the optical imaging lens 10 satisfies a conditional expression:

$$\frac{TTL}{2ImgH} = 0.670$$

where TTL is a distance from the object side surface 15 of the first lens element 1 to the image plane 99 on the optical axis I, and ImgH is half of a diagonal length of an effective pixel region on the image plane 99, that is, an image height.

TABLE 3

| Element | Surface | Radius of curvature (mm) | Spacing (mm) | Refractive index | Abbe number |
|---|---|---|---|---|---|
| First lens element 1 | Object side surface 15 | 1.473 | 0.550 | 1.55 | 55.9 |
|  | Image side surface 16 | 3.615 | 0.237 |  |  |
| Second lens element 2 | Object side surface 25 | 20.038 | 0.339 | 1.66 | 20.4 |
|  | Image side surface 26 | 4.739 | 0.050 |  |  |
| Third lens element 3 | Object side surface 35 | 11.963 | 0.333 | 1.61 | 58 |
| Fourth lens element 4 | Object side surface 45 | −3.286 | 0.326 | 1.67 | 19.5 |
|  | Image side surface 46 | 371.702 | 0.108 |  |  |
| Fifth lens element 5 | Object side surface 55 | 2.696 | 0.337 | 1.64 | 32.4 |
|  | Image side surface 56 | 172.749 | 0.529 |  |  |
| Sixth lens element 6 | Object side surface 65 | 10.989 | 0.292 | 1.49 | 57.4 |
|  | Image side surface 66 | 12.978 | 0.435 |  |  |
| Seventh lens element 7 | Object side surface 75 | −3.608 | 0.227 | 1.49 | 57.4 |
|  | Image side surface 76 | 2.933 | 0.222 |  |  |
| Filter 8 | Object side surface 85 | Infinity | 0.210 | 1.52 | 64.1 |
|  | Image side surface 86 | Infinity | 0.150 |  |  |
|  | Image plane 99 | Infinity | 0.000 |  |  |

In Table 3, a spacing of the object side surface 15 (0.550 mm as shown in Table 3) is the thickness of the first lens element 1 on the optical axis I, a spacing of the image side surface 16 (0.237 mm as shown in Table 3) is a distance between the image side surface 16 of the first lens element 1 and the object side surface 25 of the second lens element 2 on the optical axis I, that is, a gap between the first lens element 1 and the second lens element 2 on the optical axis I, and so on.

In the embodiment, the object side surfaces 15, 25, 35, 45, 55, 65, and 75 and the image side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7 are all aspheric surfaces, and the aspheric surfaces are defined according to Formula (1) above.

The conic constant K and various aspheric surface coefficients of the above aspheric surfaces in Formula (1) of the embodiment are as shown in Table 4. The number 15 in Table 4 represents the aspheric surface coefficient of the object side surface 15 of the first lens element 1, and the other numbers may be deduced by analogy. Since the third lens element 3 and the fourth lens element 4 are cemented together through the image side surface 36 of the former and the object side surface 45 of the latter, only the object side surface 45 of the fourth lens element 4 is shown in Table 4.

TABLE 4

| Surface | K | $a_2$ | $a_4$ | $a_6$ | $a_8$ |
|---|---|---|---|---|---|
| 15 | −0.021 | 0.000E+00 | 0.000E+00 | 4.760E−02 | −1.124E−01 |
| 16 | −17.519 | 0.000E+00 | 0.000E+00 | −1.165E−01 | 4.219E−01 |
| 25 | 0.000 | 0.000E+00 | 0.000E+00 | 1.375E−01 | −4.033E−01 |
| 26 | 0.000 | 0.000E+00 | 0.000E+00 | 1.377E−01 | −2.641E−01 |
| 35 | 109.706 | 0.000E+00 | 0.000E+00 | 1.489E−01 | −3.963E−01 |
| 45 | 4.733 | 0.000E+00 | 0.000E+00 | 3.431E−02 | −2.919E−01 |
| 46 | 0.000 | 0.000E+00 | 0.000E+00 | 2.579E−01 | −1.047E−01 |
| 55 | −30.905 | 0.000E+00 | 0.000E+00 | 1.362E−02 | −2.095E−03 |
| 56 | 0.000 | 0.000E+00 | 0.000E+00 | −2.074E−02 | 1.278E−02 |
| 65 | 0.000 | 0.000E+00 | 0.000E+00 | 5.447E−03 | 1.888E−04 |
| 66 | −248.990 | 0.000E+00 | 0.000E+00 | −2.813E−02 | 1.240E−02 |
| 75 | −0.456 | 0.000E+00 | 0.000E+00 | 4.643E−02 | −1.262E−02 |
| 76 | −0.817 | 0.000E+00 | 0.000E+00 | 4.079E−02 | −6.719E−03 |

| Surface | $a_{10}$ | $a_{12}$ | $a_{14}$ | $a_{16}$ | $a_{18}$ |
|---|---|---|---|---|---|
| 15 | 1.854E−01 | 0.000E+00 | −1.881E−02 | −2.089E−02 | −1.365E−02 |
| 16 | −8.869E−01 | 0.000E+00 | −1.678E−01 | 1.597E−02 | −2.217E−01 |
| 25 | 7.109E−01 | 0.000E+00 | 2.578E−01 | −1.852E−01 | −2.004E−01 |
| 26 | 1.432E−01 | 0.000E+00 | −1.208E−01 | −2.929E−01 | −5.215E−01 |
| 35 | 4.319E−01 | 0.000E+00 | −1.309E−01 | −1.185E−01 | 1.957E−02 |
| 45 | 6.215E−01 | 0.000E+00 | −6.350E−01 | −4.146E−01 | −2.073E+00 |
| 46 | −1.493E−01 | 0.000E+00 | 3.326E−02 | −5.078E−02 | 5.476E−03 |
| 55 | −1.334E−02 | 0.000E+00 | −9.541E−04 | 2.934E−04 | 9.886E−04 |
| 56 | −2.395E−03 | 0.000E+00 | −1.158E−04 | −2.631E−04 | −6.891E−05 |
| 65 | −7.383E−03 | 0.000E+00 | −1.300E−04 | −7.395E−05 | 1.449E−05 |
| 66 | −1.751E−03 | 0.000E+00 | 1.963E−04 | −7.284E−05 | 8.894E−06 |
| 75 | 5.846E−03 | 0.000E+00 | 2.964E−05 | 2.658E−05 | −2.250E−06 |
| 76 | −2.318E−04 | 0.000E+00 | −3.376E−05 | 1.650E−06 | −2.344E−08 |

| Surface | $a_{20}$ | $a_{22}$ | $a_{24}$ | $a_{26}$ | $a_{28}$ |
|---|---|---|---|---|---|
| 15 | 0.000E+00 | 3.590E−02 | −1.124E−01 | 0.000E+00 | 0.000E+00 |
| 16 | 0.000E+00 | −3.626E−01 | 4.219E−01 | 0.000E+00 | 0.000E+00 |
| 25 | 0.000E+00 | 8.519E−02 | −4.033E−01 | 0.000E+00 | 0.000E+00 |
| 26 | 0.000E+00 | −1.175E−02 | −2.641E−01 | 0.000E+00 | 0.000E+00 |
| 35 | 0.000E+00 | −1.631E−01 | −3.963E−01 | 0.000E+00 | 0.000E+00 |
| 45 | 0.000E+00 | 4.669E+00 | −2.919E−01 | 0.000E+00 | 0.000E+00 |
| 46 | 0.000E+00 | −2.854E−04 | −1.047E−01 | 0.000E+00 | 0.000E+00 |
| 55 | 0.000E+00 | 6.629E−04 | −2.095E−03 | 0.000E+00 | 4.528E−05 |
| 56 | 0.000E+00 | −1.749E−05 | 1.278E−02 | 0.000E+00 | −1.252E−06 |
| 65 | 0.000E+00 | 4.096E−06 | 1.888E−04 | 0.000E+00 | −1.489E−06 |
| 66 | 0.000E+00 | 7.052E−08 | 1.240E−02 | 0.000E+00 | 1.538E−09 |
| 75 | 0.000E+00 | 7.709E−08 | −1.262E−02 | 0.000E+00 | 8.339E−12 |
| 76 | 0.000E+00 | −1.025E−10 | −6.719E−03 | 0.000E+00 | 3.514E−12 |

Figure 2B:
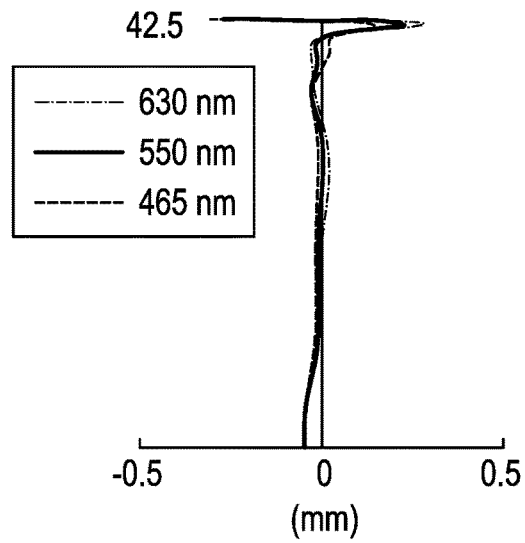
FIG. 2B is a schematic diagram of field curvature of the imaging lens according to the second embodiment.
Figure 2B:
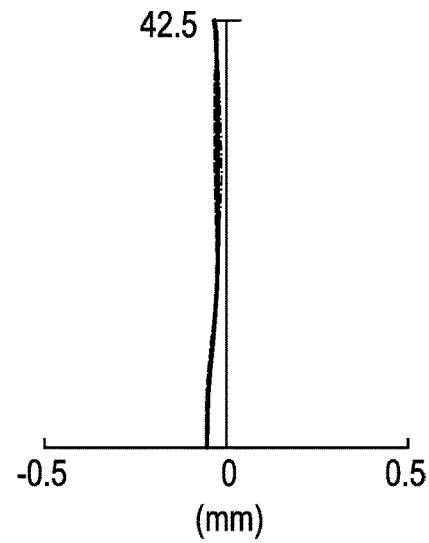
Figure 2C:
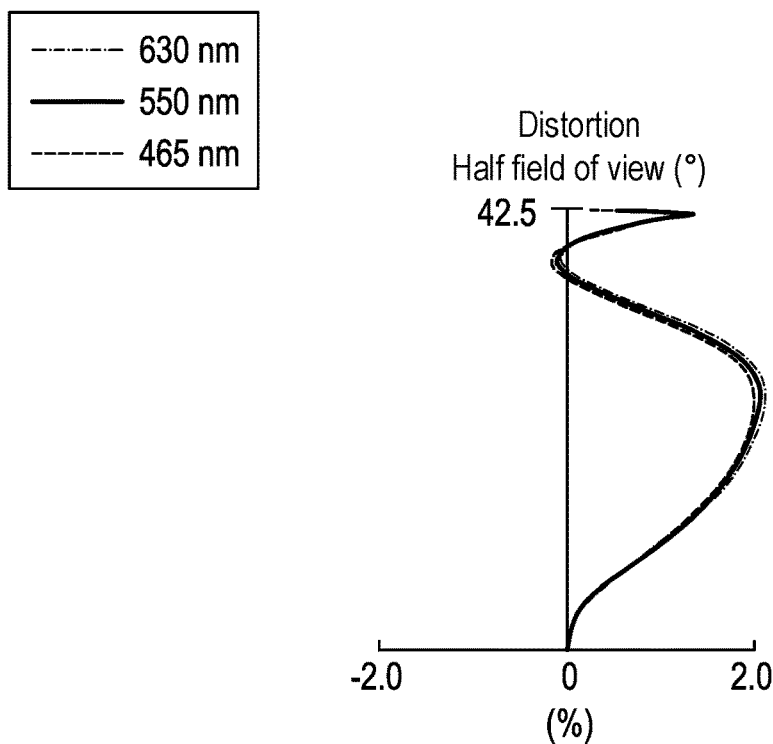
FIG. 2C is a schematic diagram of distortion of the imaging lens according to the second embodiment.
Figure 2D:
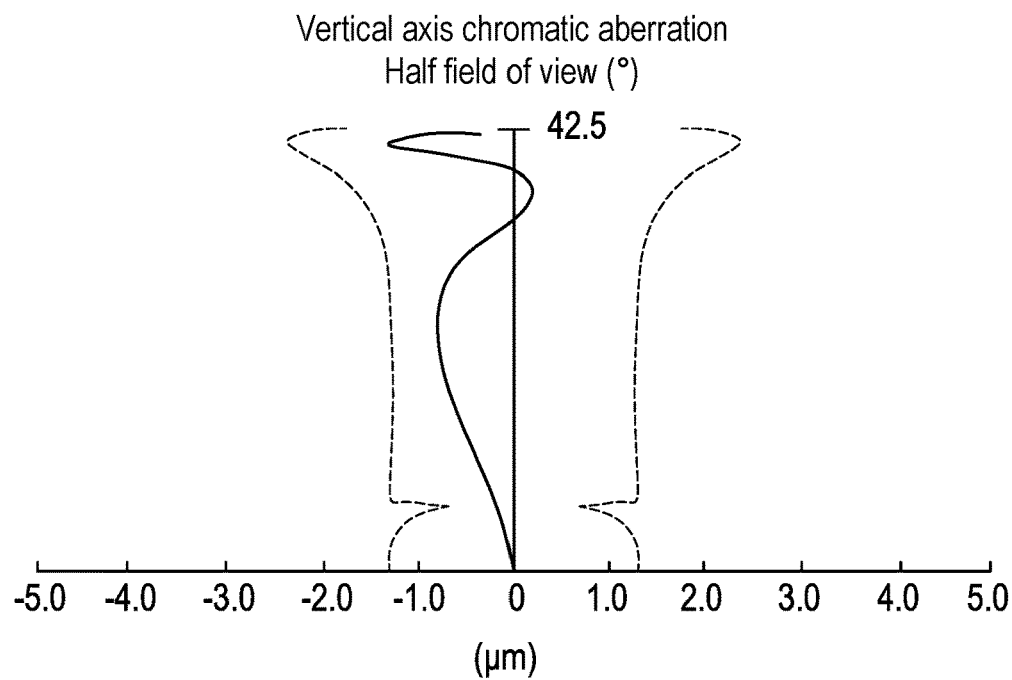
FIG. 2D is a schematic diagram of vertical axis chromatic aberration of the imaging lens according to the second embodiment.
Figure 2E:
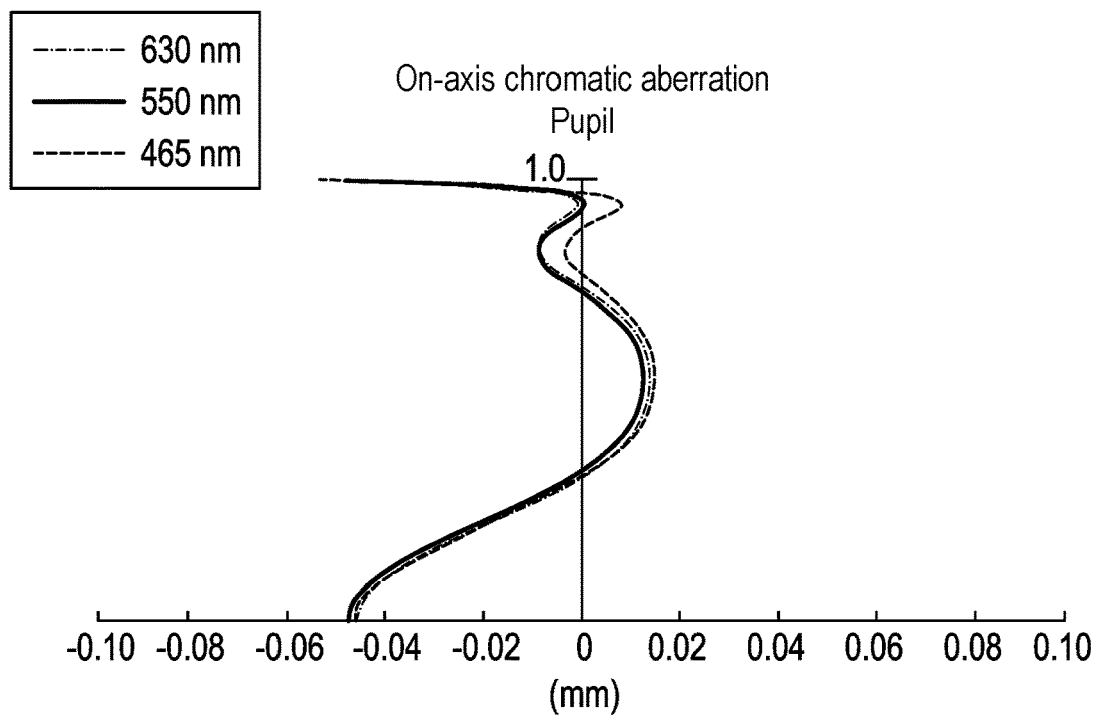
FIG. 2E is a schematic diagram of on-axis chromatic aberration of the imaging lens according to the second embodiment.

Please refer again to FIG. 2B to FIG. 2F. FIG. 2B is a schematic diagram of field curvature of the imaging lens according to the second embodiment, wherein part (A) of FIG. 2B is the tangential direction, and part (B) of FIG. 2B is the sagittal direction. FIG. 2C is a schematic diagram of distortion of the imaging lens according to the second embodiment, FIG. 2D is a schematic diagram of vertical axis chromatic aberration of the imaging lens according to the second embodiment, FIG. 2E is a schematic diagram of on-axis chromatic aberration of the imaging lens according to the second embodiment, FIG. 2F is a schematic diagram of a modulation transfer function of the imaging lens according to the second embodiment.

As shown in FIG. 2B, when different color lights with wavelengths of 465 nm, 550 nm, and 630 nm are respectively incident on the imaging lens 10, the field curvatures of each color light at different field angles all fall within the range of ±0.30 mm. The distortion aberration diagram of FIG. 2C shows that the distortion aberration of the imaging lens 10 is maintained within the range of ±2%. FIG. 2D shows that when different color lights with wavelengths of 465 nm, 550 nm, and 630 nm are respectively incident on the imaging lens 10, the position of the 550 nm color light is used as the reference zero point on the image plane 99 perpendicular to the optical axis I, and the positional difference between the 465 nm color light and the 630 nm color light is compared, the schematic diagram of vertical axis chromatic aberration as shown in FIG. 2D is shown, it can be seen that the vertical axis chromatic aberrations of the imaging lens 10 at different field angles all fall within a diffraction limit (shown as dashed lines in FIG. 2D) and fall within the range of ±2.0 µm. Please refer to FIG. 2E. When different color lights with wavelengths of 465 nm, 550 nm, and 630 nm are respectively incident on the imaging lens 10, the imaging positions on the optical axis I are different along with different aperture angles to form on-axis chromatic aberration, and the on-axis chromatic aberrations of the various color lights all fall within the range of ±0.06 mm.

Figure 2F:
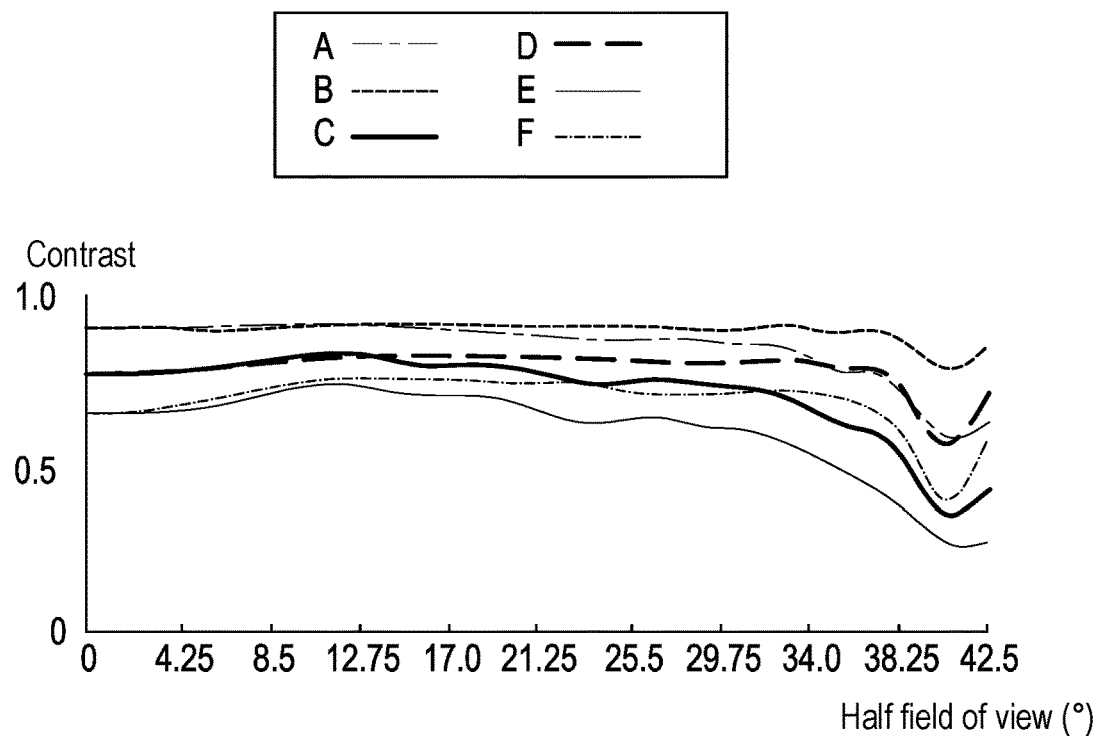
FIG. 2F is a schematic diagram of a modulation transfer function of the imaging lens according to the second embodiment.

Please refer to FIG. 2F. In FIG. 2F, a curve A represents the radius value of 50 lp/mm (sagittal), a curve B represents the tangent value of 50 lp/mm (tangential), a curve C represents the radius value of 100 lp/mm, a curve D represents the tangent value of 100 lp/mm, a curve E represents the radius value of 150 lp/mm, and a curve F represents the tangent value of 150 lp/mm. As shown in FIG. 2F, when the resolving power of the imaging lens 10 is respectively tested using lines with spatial frequencies of 50 lp/mm, 100 lp/mm, and 150 lp/mm, the imaging lens 10 has good resolving power at least within the half field of view of 38.25°, which means that the imaging lens 10 has high restoration ability. FIG. 2B to FIG. 2F illustrate that the imaging lens 10 according to the second embodiment of the disclosure as shown in FIG. 2A has good imaging quality.

Figure 3A:
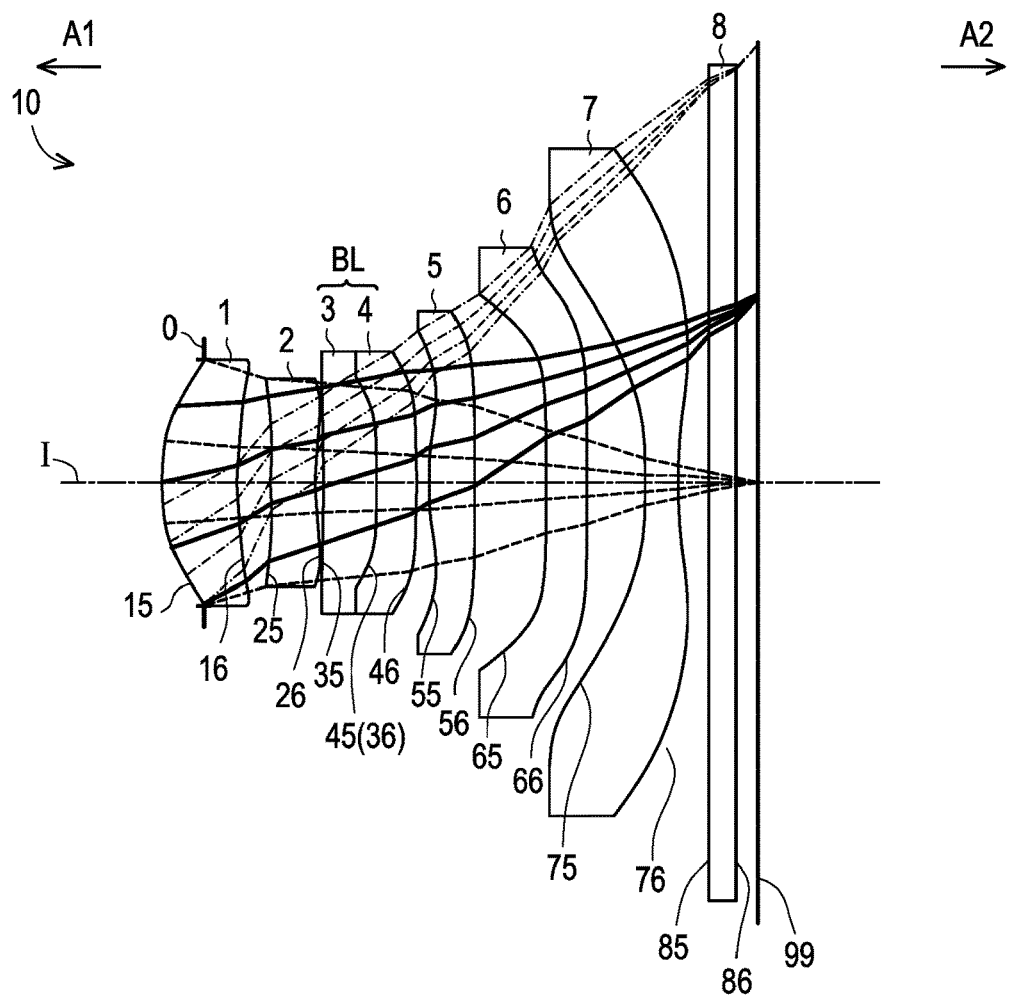
FIG. 3A is a schematic diagram of an imaging lens according to a third embodiment of the disclosure.

Please refer to FIG. 3A, which shows a schematic diagram of an imaging lens according to a third embodiment of the disclosure. An imaging lens 10 according to the third embodiment of the disclosure sequentially includes an aperture 0, a first lens element 1, a second lens element 2, a third lens element 3, a fourth lens element 4, a fifth lens element 5, a sixth lens element 6, a seventh lens element 7, and a filter 8 from an object side A1 to an image side A2 along an optical axis I of the imaging lens 10. When light rays emitted by an object to be captured enters the imaging lens 10 and sequentially passes through the aperture 0, the first lens element 1, the second lens element 2, the third lens element 3, the fourth lens element 4, the fifth lens element 5, the sixth lens element 6, the seventh lens element 7, and the filter 8, an image is formed on an image plane 99. In the embodiment, the aperture 0 is disposed on the object side A1 of the first lens element 1.

The first lens element 1 has positive refracting power, an optical axis region of an object side surface 15 is convex, an optical axis region of an image side surface 16 is concave, and the object side surface 15 and the image side surface 16 are both aspheric surfaces. The second lens element 2 has negative refracting power, an optical axis region of an object side surface 25 is convex, an optical axis region of an image side surface 26 is concave, and the object side surface 25 and the image side surface 26 are both aspheric surfaces. An optical axis region of an object side surface 35 of the third lens element 3 is convex and is an aspheric surface. An optical axis region of an object side surface 45 of the fourth lens element 4 is concave, an optical axis region of an image side surface 46 is convex, and the object side surface 45 and the image side surface 46 are both aspheric surfaces. A cemented lens element BL formed by cementing the third lens element 3 and the fourth lens element 4 has positive refracting power. The fifth lens element 5 has positive refracting power, an optical axis region of an object side surface 55 is convex, an optical axis region of an image side surface 56 is concave, and the object side surface 55 and the image side surface 56 are both aspheric surfaces. The sixth lens element 6 has positive refracting power, an optical axis region of an object side surface 65 is convex, an optical axis region of an image side surface 66 is concave, and the object side surface 65 and the image side surface 66 are both aspheric surfaces. The seventh lens element 7 has negative refracting power, an optical axis region of an object side surface 75 is concave, an optical axis region of an image side surface 76 is concave, and the object side surface 75 and the image side surface 76 are both aspheric surfaces. A refractive index Nd of the fourth lens element 4 is 1.66, and an Abbe number is 18.2.

Other detailed optical data according to the third embodiment are shown in Table 5. The full field of view of the optical imaging lens 10 is 85°, the aperture value (F-number) is 1.880, the effective focal length (EFL) is 3.374 mm, and the optical imaging lens 10 satisfies a conditional expression:

$$\frac{TTL}{2 ImgH} = 0.673$$

where TTL is a distance from the object side surface 15 of the first lens element 1 to the image plane 99 on the optical axis I, and ImgH is half of a diagonal length of an effective pixel region on the image plane 99, that is, an image height.

TABLE 5

| Element | Surface | Radius of curvature (mm) | Spacing (mm) | Refractive index | Abbe number |
|---|---|---|---|---|---|
| First lens element 1 | Object side surface 15 | 1.482 | 0.548 | 1.550 | 56.000 |
| | Image side surface 16 | 3.625 | 0.245 | | |
| Second lens element 2 | Object side surface 25 | 17.963 | 0.354 | 1.660 | 20.400 |
| | Image side surface 26 | 4.715 | 0.055 | | |

TABLE 5-continued

| Element | Surface | Radius of curvature (mm) | Spacing (mm) | Refractive index | Abbe number |
|---|---|---|---|---|---|
| Third lens element 3 | Object side surface 35 | 11.666 | 0.375 | 1.610 | 58.000 |
| Fourth lens element 4 | Object side surface 45 | −3.136 | 0.274 | 1.660 | 18.200 |
|  | Image side surface 46 | −138.831 | 0.108 |  |  |
| Fifth lens element 5 | Object side surface 55 | 2.769 | 0.299 | 1.640 | 19.000 |
|  | Image side surface 56 | 1180.134 | 0.548 |  |  |
| Sixth lens element 6 | Object side surface 65 | 10.586 | 0.280 | 1.590 | 61.000 |
|  | Image side surface 66 | 14.909 | 0.431 |  |  |
| Seventh lens element 7 | Object side surface 75 | −3.559 | 0.238 | 1.590 | 31.000 |
|  | Image side surface 76 | 3.203 | 0.211 |  |  |
| Filter 8 | Object side surface 85 | Infinity | 0.210 | 1.520 | 64.100 |
|  | Image side surface 86 | Infinity | 0.150 |  |  |
|  | Image plane 99 | Infinity | 0.000 |  |  |

In Table 5, a spacing of the object side surface 15 (0.548 mm as shown in Table 5) is the thickness of the first lens element 1 on the optical axis I, a spacing of the image side surface 16 (0.245 mm as shown in Table 5) is a distance between the image side surface 16 of the first lens element 1 and the object side surface 25 of the second lens element 2 on the optical axis I, that is, a gap between the first lens element 1 and the second lens element 2 on the optical axis I, and so on.

In the embodiment, the object side surfaces 15, 25, 35, 45, 55, 65, and 75 and the image side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7 are all aspheric surfaces, and the aspheric surfaces are defined according to Formula (1) above.

The conic constant K and various aspheric surface coefficients of the above aspheric surfaces in Formula (1) of the embodiment are as shown in Table 6. The number 15 in Table 6 represents the aspheric surface coefficient of the object side surface 15 of the first lens element 1, and the other numbers may be deduced by analogy. Since the third lens element 3 and the fourth lens element 4 are cemented together through the image side surface 36 of the former and the object side surface 45 of the latter, only the object side surface 45 of the fourth lens element 4 is shown in Table 6.

TABLE 6

| Surface | K | $a_2$ | $a_4$ | $a_6$ | $a_8$ |
|---|---|---|---|---|---|
| 15 | −0.030 | 0.000E+00 | 0.000E+00 | 4.720E−02 | −1.139E−01 |
| 16 | −16.838 | 0.000E+00 | 0.000E+00 | −1.173E−01 | 4.248E−01 |
| 25 | 0.000 | 0.000E+00 | 0.000E+00 | 1.403E−01 | −4.078E−01 |
| 26 | 0.000 | 0.000E+00 | 0.000E+00 | 1.375E−01 | −2.610E−01 |
| 35 | 107.303 | 0.000E+00 | 0.000E+00 | 1.495E−01 | −4.114E−01 |
| 45 | 9.928 | 0.000E+00 | 0.000E+00 | 1.120E−01 | −2.321E−01 |
| 46 | 0.000 | 0.000E+00 | 0.000E+00 | 2.543E−01 | −1.067E−01 |
| 55 | −31.072 | 0.000E+00 | 0.000E+00 | 1.256E−02 | −3.744E−03 |
| 56 | 0.000 | 0.000E+00 | 0.000E+00 | −2.014E−02 | 1.315E−02 |
| 65 | 0.000 | 0.000E+00 | 0.000E+00 | 5.143E−03 | −7.884E−04 |
| 66 | −315.894 | 0.000E+00 | 0.000E+00 | −2.802E−02 | 1.248E−02 |
| 75 | −0.449 | 0.000E+00 | 0.000E+00 | 4.640E−02 | −1.263E−02 |
| 76 | −0.959 | 0.000E+00 | 0.000E+00 | 4.105E−02 | −6.695E−03 |

| Surface | $a_{10}$ | $a_{12}$ | $a_{14}$ | $a_{16}$ | $a_{18}$ |
|---|---|---|---|---|---|
| 15 | 1.851E−01 | 0.000E+00 | −1.671E−02 | −2.103E−02 | 0.000E+00 |
| 16 | −8.855E−01 | 0.000E+00 | −1.881E−01 | −1.570E−02 | 0.000E+00 |
| 25 | 6.973E−01 | 0.000E+00 | 2.447E−01 | −1.878E−01 | 0.000E+00 |
| 26 | 1.401E−01 | 0.000E+00 | −1.474E−01 | −2.865E−01 | 0.000E+00 |
| 35 | 4.084E−01 | 0.000E+00 | −1.155E−01 | −5.873E−02 | 0.000E+00 |
| 45 | 6.357E−01 | 0.000E+00 | −2.738E−01 | 3.658E−01 | 0.000E+00 |
| 46 | −1.509E−01 | 0.000E+00 | 3.078E−02 | −5.560E−02 | 0.000E+00 |
| 55 | −1.437E−02 | 0.000E+00 | −1.101E−03 | 4.594E−04 | 0.000E+00 |
| 56 | −2.088E−03 | 0.000E+00 | −1.065E−05 | −2.324E−04 | 0.000E+00 |
| 65 | −7.341E−03 | 0.000E+00 | −1.157E−05 | −4.309E−05 | 0.000E+00 |
| 66 | −1.741E−03 | 0.000E+00 | 1.966E−04 | −7.258E−05 | 0.000E+00 |
| 75 | 5.844E−03 | 0.000E+00 | 2.963E−05 | 2.661E−05 | 0.000E+00 |
| 76 | −2.326E−04 | 0.000E+00 | −3.380E−05 | 1.648E−06 | 0.000E+00 |

| Surface | $a_{20}$ | $a_{22}$ | $a_{24}$ | $a_{26}$ | $a_{28}$ |
|---|---|---|---|---|---|
| 15 | 4.720E−02 | 0.000E+00 | −5.690E−02 | 0.000E+00 | 0.000E+00 |
| 16 | −1.173E−01 | 0.000E+00 | 6.776E−01 | 0.000E+00 | 0.000E+00 |
| 25 | 1.403E−01 | 0.000E+00 | 1.013E+00 | 0.000E+00 | 0.000E+00 |
| 26 | 1.375E−01 | 0.000E+00 | 5.789E−01 | 0.000E+00 | 0.000E+00 |
| 35 | 1.495E−01 | 0.000E+00 | −3.382E+00 | 0.000E+00 | 0.000E+00 |
| 45 | 1.120E−01 | 0.000E+00 | 1.361E+00 | 0.000E+00 | 0.000E+00 |
| 46 | 2.543E−01 | 0.000E+00 | 1.126E−02 | 0.000E+00 | 0.000E+00 |
| 55 | 1.256E−02 | 0.000E+00 | 3.413E−04 | 0.000E+00 | −1.332E−01 |
| 56 | −2.014E−02 | 0.000E+00 | 2.990E−06 | 0.000E+00 | −4.323E−02 |
| 65 | 5.143E−03 | 0.000E+00 | −2.756E−07 | 0.000E+00 | −1.511E−01 |
| 66 | −2.802E−02 | 0.000E+00 | 2.220E−08 | 0.000E+00 | −5.133E−02 |
| 75 | 4.640E−02 | 0.000E+00 | −1.616E−08 | 0.000E+00 | −1.116E−01 |
| 76 | 4.105E−02 | 0.000E+00 | −3.432E−11 | 0.000E+00 | −1.288E−01 |

Figure 3B:
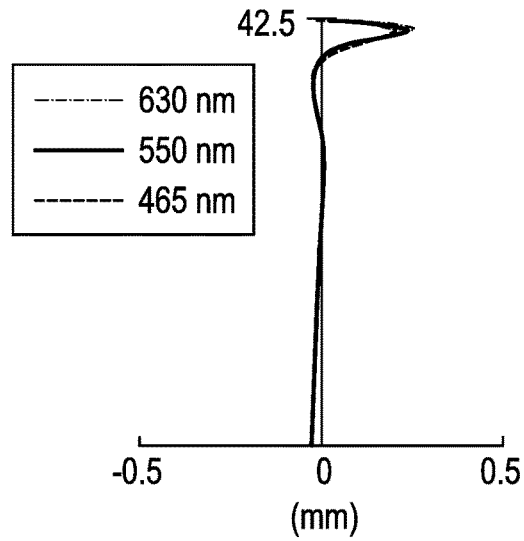
FIG. 3B is a schematic diagram of field curvature of the imaging lens according to the third embodiment.
Figure 3B:
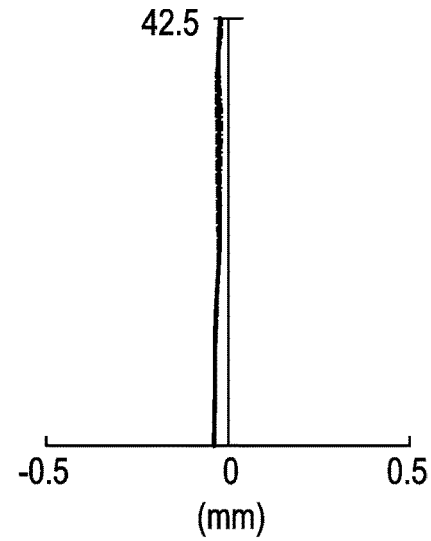
Figure 3C:
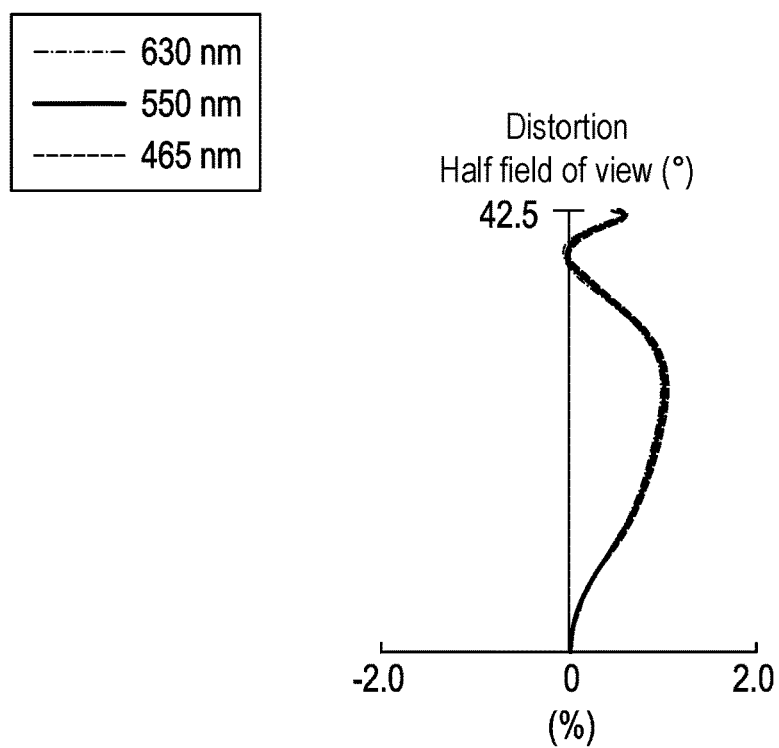
FIG. 3C is a schematic diagram of distortion of the imaging lens according to the third embodiment.
Figure 3D:
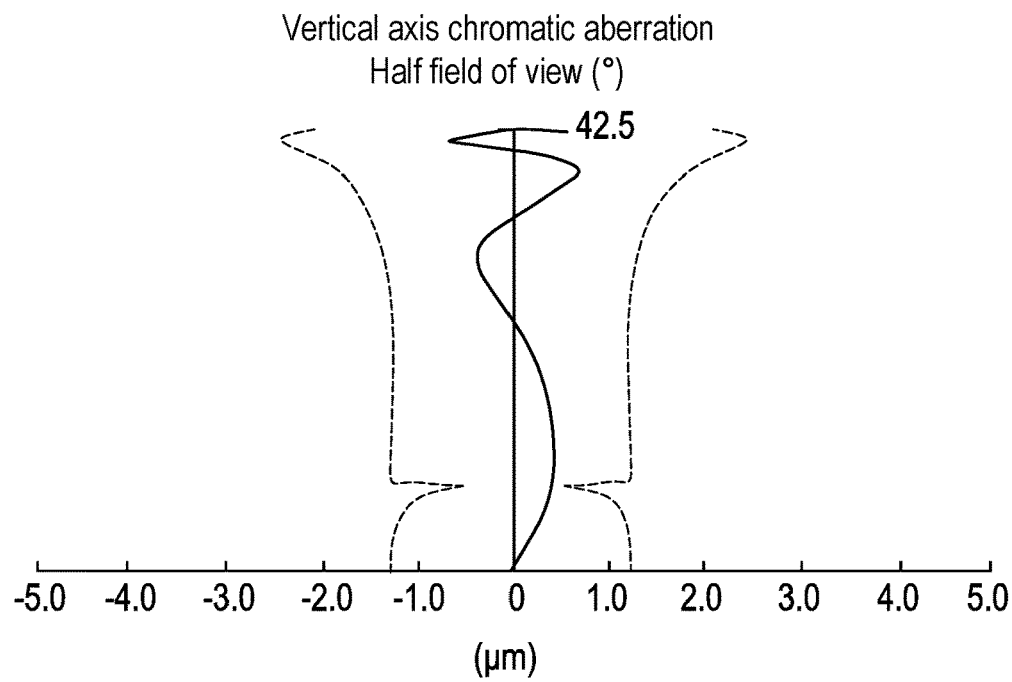
FIG. 3D is a schematic diagram of vertical axis chromatic aberration of the imaging lens according to the third embodiment.
Figure 3E:
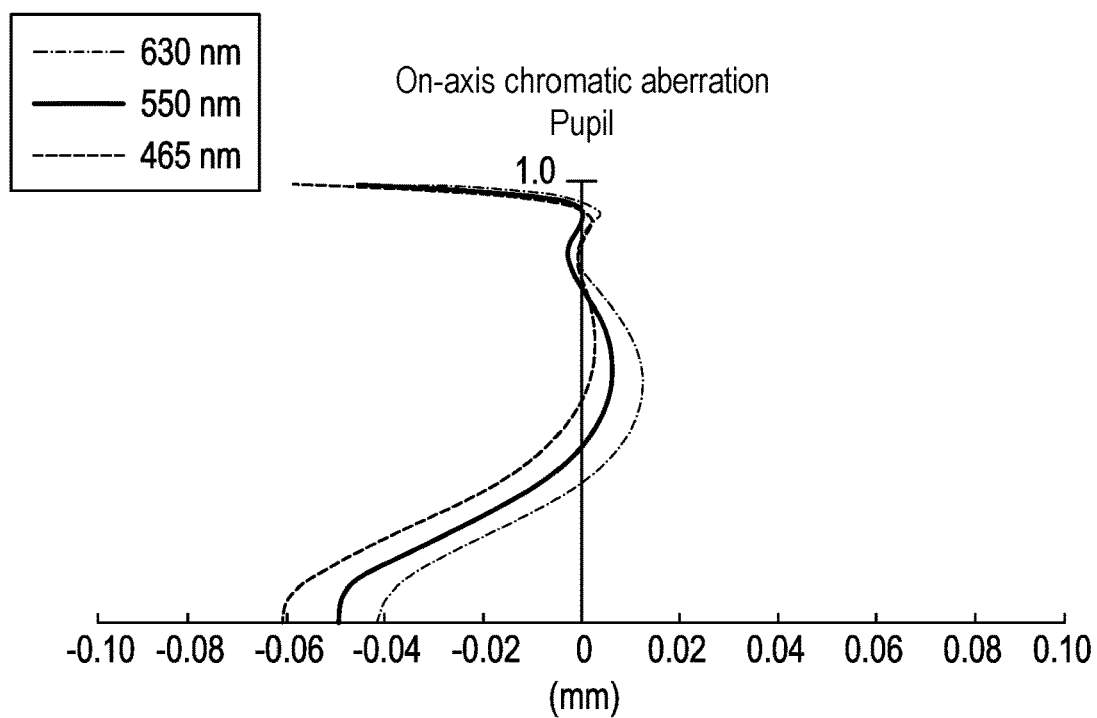
FIG. 3E is a schematic diagram of on-axis chromatic aberration of the imaging lens according to the third embodiment.
Figure 3F:
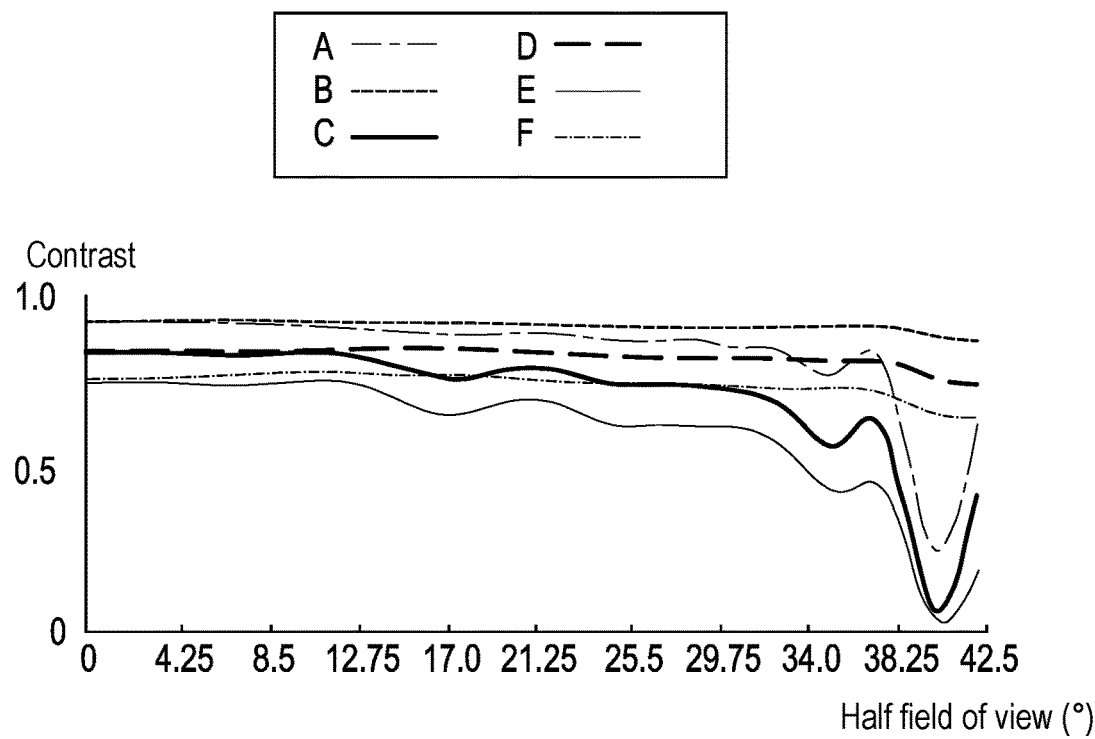
FIG. 3F is a schematic diagram of a modulation transfer function of the imaging lens according to the third embodiment.

Please refer to FIG. 3B to FIG. 3F. FIG. 3B is a schematic diagram of field curvature of the imaging lens according to the third embodiment, wherein part (A) of FIG. 3B is the tangential direction, and part (B) of FIG. 3B is the sagittal direction. FIG. 3C is a schematic diagram of distortion of the imaging lens according to the third embodiment, FIG. 3D is a schematic diagram of vertical axis chromatic aberration of the imaging lens according to the third embodiment, FIG. 3E is a schematic diagram of on-axis chromatic aberration of the imaging lens according to the third embodiment, and FIG. 3F is a schematic diagram of a modulation transfer function of the imaging lens according to the third embodiment.

As shown in FIG. 3B, when different color lights with wavelengths of 465 nm, 550 nm, and 630 nm are respectively incident on the imaging lens 10, the field curvatures of each color light at different field angles all fall within the range of ±0.60 mm. The distortion aberration diagram of FIG. 3C shows that the distortion aberration of the imaging lens 10 is maintained within the range of ±3%. FIG. 3D shows that when different color lights with wavelengths of 465 nm, 550 nm, and 630 nm are respectively incident on the imaging lens 10, the position of the 550 nm color light is used as the reference zero point on the image plane 99 perpendicular to the optical axis I, and the positional difference between the 465 nm color light and the 630 nm color light is compared, the schematic diagram of vertical axis chromatic aberration as shown in FIG. 3D is shown, it can be seen that the vertical axis chromatic aberrations of the imaging lens 10 at different field angles all fall within a diffraction limit (shown as dashed lines in FIG. 3D) and fall within the range of ±1.0 μm. Please refer to FIG. 3E. When different color lights with wavelengths of 465 nm, 550 nm, and 630 nm are respectively incident on the imaging lens 10, the imaging positions on the optical axis I are different along with different aperture angles to form on-axis chromatic aberration, and the on-axis chromatic aberrations of the various color lights all fall within the range of ±0.08 mm.

Please refer to FIG. 3F. In FIG. 3F, a curve A represents the radius value of 50 lp/mm (sagittal), a curve B represents the tangent value of 50 lp/mm (tangential), a curve C represents the radius value of 100 lp/mm, a curve D represents the tangent value of 100 lp/mm, a curve E represents the radius value of 150 lp/mm, and a curve F represents the tangent value of 150 lp/mm. As shown in FIG. 3F, when the resolving power of the imaging lens 10 is respectively tested using lines with spatial frequencies of 50 lp/mm, 100 lp/mm, and 150 lp/mm, the imaging lens 10 has good resolving power at least within the half field of view 38.25°, which means that the imaging lens 10 has high restoration ability. FIG. 3B to FIG. 3F illustrate that the imaging lens 10 according to the third embodiment of the disclosure as shown in FIG. 3A has good imaging quality.

Figure 4A:
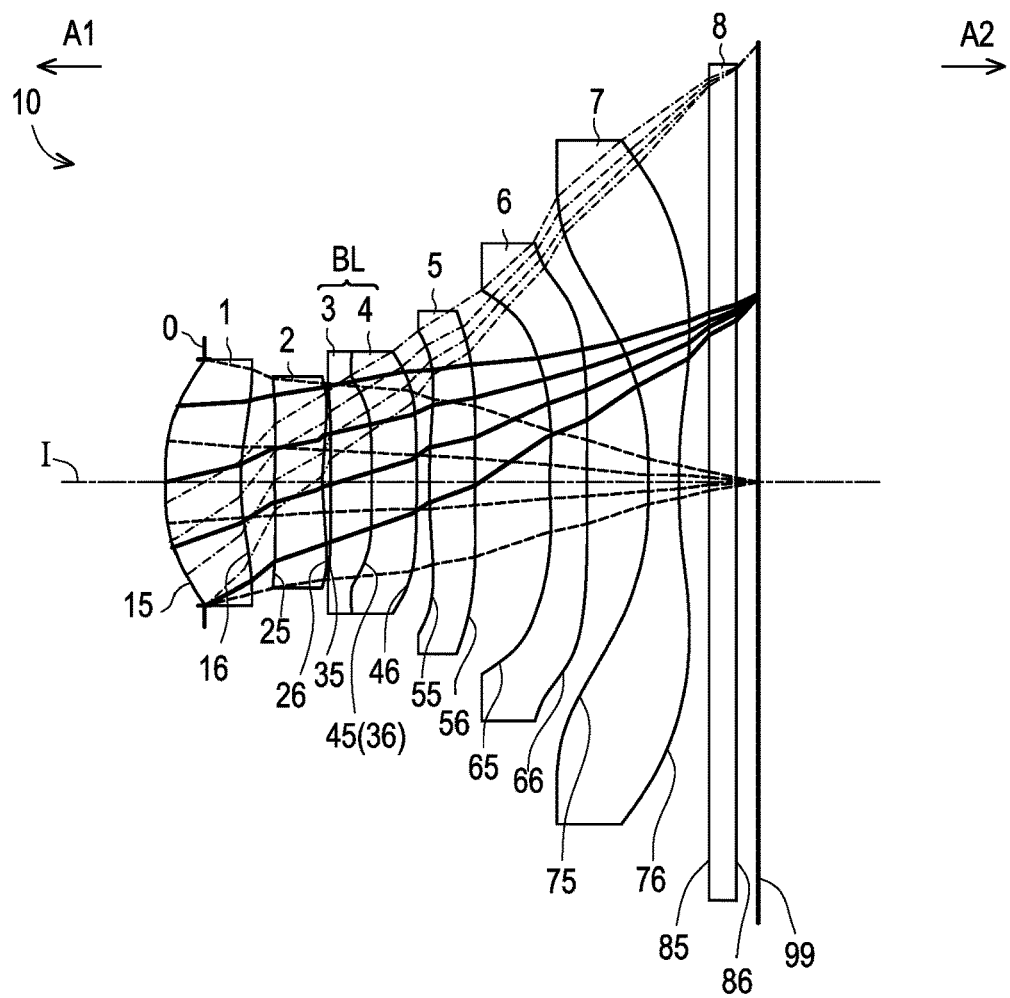
FIG. 4A is a schematic diagram of an imaging lens according to a fourth embodiment of the disclosure.

Please refer to FIG. 4A, which is a schematic diagram of an imaging lens according to a fourth embodiment of the disclosure. An imaging lens 10 according to the fourth embodiment of the disclosure sequentially includes an aperture 0, a first lens element 1, a second lens element 2, a third lens element 3, a fourth lens element 4, a fifth lens element 5, a sixth lens element 6, a seventh lens element 7, and a filter 8 from an object side A1 to an image side A2 along an optical axis I of the imaging lens 10. When light rays emitted by an object to be captured enters the imaging lens 10 and sequentially passes through the aperture 0, the first lens element 1, the second lens element 2, the third lens element 3, the fourth lens element 4, the fifth lens element 5, the sixth lens element 6, the seventh lens element 7, and the filter 8, an image is formed on an image plane 99. In the embodiment, the aperture 0 is disposed on the object side A1 of the first lens element 1.

The first lens element 1 has positive refracting power, an optical axis region of an object side surface 15 is convex, an optical axis region of an image side surface 16 is concave, and the object side surface 15 and the image side surface 16 are both aspheric surfaces. The second lens element 2 has negative refracting power, an optical axis region of an object side surface 25 is convex, an optical axis region of an image side surface 26 is concave, and the object side surface 25 and the image side surface 26 are both aspheric surfaces. An optical axis region of an object side surface 35 of the third lens element 3 is convex and is an aspheric surface. An optical axis region of an object side surface 45 of the fourth lens element 4 is concave, an optical axis region of an image side surface 46 is convex, and the object side surface 45 and the image side surface 46 are both aspheric surfaces. A cemented lens element BL formed by cementing the third lens element 3 and the fourth lens element 4 has positive refracting power. The fifth lens element 5 has positive refracting power, an optical axis region of an object side surface 55 is convex, an optical axis region of an image side surface 56 is concave, and the object side surface 55 and the image side surface 56 are both aspheric surfaces. The sixth lens element 6 has positive refracting power, an optical axis region of an object side surface 65 is convex, an optical axis region of an image side surface 66 is concave, and the object side surface 65 and the image side surface 66 are both aspheric surfaces. The seventh lens element 7 has negative refracting power, an optical axis region of an object side surface 75 is concave, an optical axis region of an image side surface 76 is concave, and the object side surface 75 and the image side surface 76 are both aspheric surfaces. A refractive index Nd of the fourth lens element 4 is 1.66, and an Abbe number is 20.4.

Other detailed optical data according to the fourth embodiment are shown in Table 7. The full field of view of the optical imaging lens 10 is 85°, the aperture value (F-number) is 1.880, the effective focal length (EFL) is 3.310 mm, and the optical imaging lens 10 satisfies a conditional expression:

$$\frac{TTL}{2ImgH} = 0.675$$

where TTL is a distance from the object side surface 15 of the first lens element 1 to the image plane 99 on the optical axis I, and ImgH is half of a diagonal length of an effective pixel region on the image plane 99, that is, an image height.

TABLE 7

| Element | Surface | Radius of curvature (mm) | Spacing (mm) | Refractive index | Abbe number |
|---|---|---|---|---|---|
| First lens element 1 | Object side surface 15 | 1.469 | 0.547 | 1.55 | 56 |
| | Image side surface 16 | 3.576 | 0.235 | | |
| Second lens element 2 | Object side surface 25 | 20.358 | 0.344 | 1.64 | 22.4 |
| | Image side surface 26 | 4.803 | 0.049 | | |
| Third lens element 3 | Object side surface 35 | 11.623 | 0.296 | 1.62 | 58 |
| Fourth lens element 4 | Object side surface 45 | −3.002 | 0.300 | 1.66 | 20.4 |
| | Image side surface 46 | −2674.146 | 0.109 | | |
| Fifth lens element 5 | Object side surface 55 | 2.695 | 0.328 | 1.63 | 28.2 |
| | Image side surface 56 | 373.292 | 0.530 | | |
| Sixth lens element 6 | Object side surface 65 | 11.932 | 0.286 | 1.55 | 56 |
| | Image side surface 66 | 18.735 | 0.436 | | |
| Seventh lens element 7 | Object side surface 75 | −3.608 | 0.211 | 1.53 | 56 |
| | Image side surface 76 | 3.015 | 0.210 | | |
| Filter 8 | Object side surface 85 | Infinity | 0.210 | 1.52 | 64.1 |
| | Image side surface 86 | Infinity | 0.150 | | |
| | Image plane 99 | Infinity | 0.000 | | |

In Table 7, a spacing of the object side surface 15 (0.547 mm as shown in Table 7) is the thickness of the first lens element 1 on the optical axis I, a spacing of the image side surface 16 (0.235 mm as shown in Table 7) is a distance between the image side surface 16 of the first lens element 1 and the object side surface 25 of the second lens element 2 on the optical axis I, that is, a gap between the first lens element 1 and the second lens element 2 on the optical axis I, and so on.

In the embodiment, the object side surfaces 15, 25, 35, 45, 55, 65, and 75 and the image side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7 are all aspheric surfaces, and the aspheric surfaces are defined according to Formula (1) above.

The conic constant K and various aspheric surface coefficients of the above aspheric surfaces in Formula (1) of the embodiment are as shown in Table 8. The number 15 in Table 8 represents the aspheric surface coefficient of the object side surface 15 of the first lens element 1, and the other numbers may be deduced by analogy. Since the third lens element 3 and the fourth lens element 4 are cemented together through the image side surface 36 of the former and the object side surface 45 of the latter, only the object side surface 45 of the fourth lens element 4 is shown in Table 8.

Figure 4B:
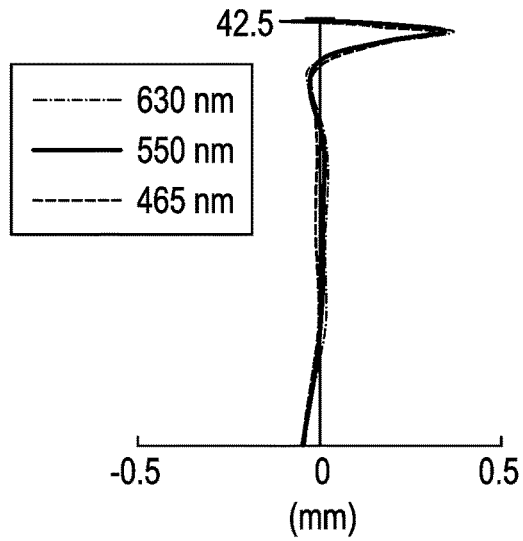
FIG. 4B is a schematic diagram of field curvature of the imaging lens according to the fourth embodiment.
Figure 4B:
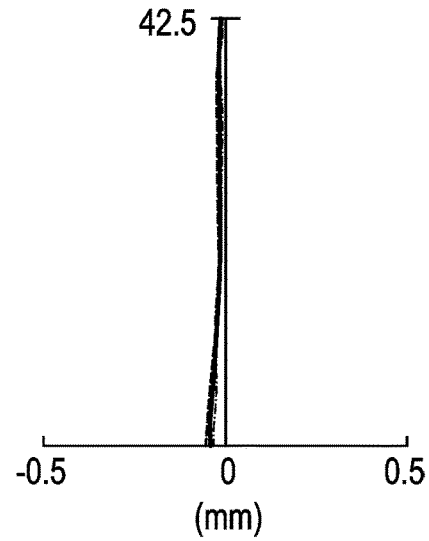
Figure 4C:
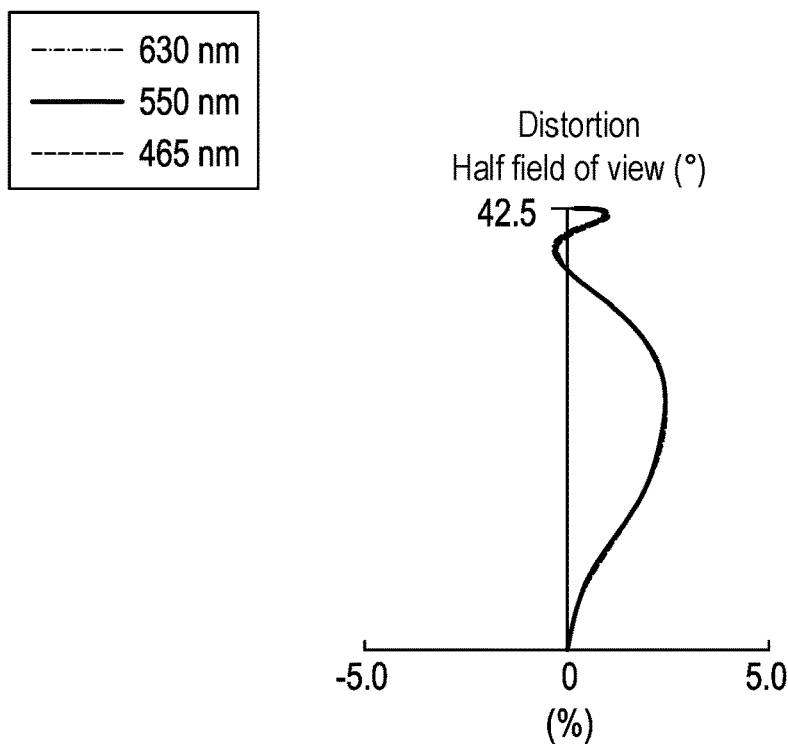
FIG. 4C is a schematic diagram of distortion of the imaging lens according to the fourth embodiment.
Figure 4D:
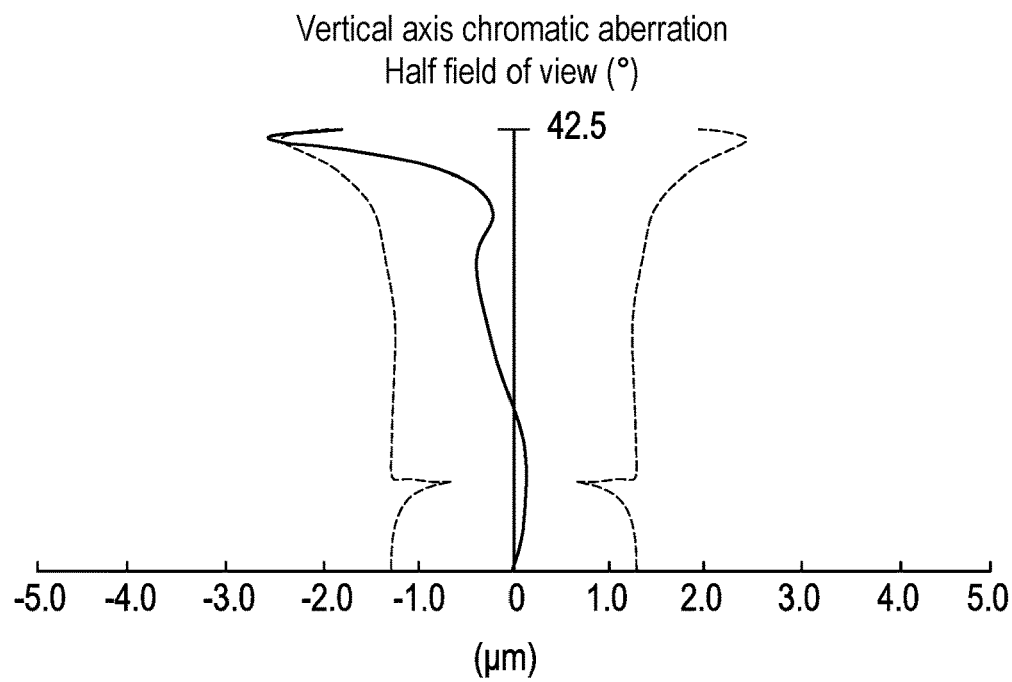
FIG. 4D is a schematic diagram of vertical axis chromatic aberration of the imaging lens according to the fourth embodiment.

As shown in FIG. 4B. When different color lights with wavelengths of 465 nm, 550 nm, and 630 nm are respectively incident on the imaging lens 10, the field curvatures of each color light at different field angles all fall within the range of ±0.40 mm. The distortion aberration diagram of FIG. 4C shows that the distortion aberration of the imaging lens 10 is maintained within the range of ±3%. FIG. 4D shows that when different color lights with wavelengths of 465 nm, 550 nm, and 630 nm are respectively incident on the imaging lens 10, the position of the 550 nm color light on the image plane 99 perpendicular to the optical axis I is used as the reference zero point, and the positional difference

TABLE 8

| Surface | K | $a_2$ | $a_4$ | $a_6$ | $a_8$ |
|---|---|---|---|---|---|
| 15 | −0.023 | 0.000E+00 | −4.802E−03 | 4.548E−02 | 0.000E+00 |
| 16 | −17.457 | 0.000E+00 | 2.860E−02 | −1.156E−01 | 0.000E+00 |
| 25 | 0.000 | 0.000E+00 | −1.691E−01 | 1.374E−01 | 0.000E+00 |
| 26 | 0.000 | 0.000E+00 | −1.842E−01 | 1.375E−01 | 0.000E+00 |
| 35 | 112.485 | 0.000E+00 | −1.379E−01 | 1.492E−01 | 0.000E+00 |
| 45 | 5.239 | 0.000E+00 | −7.093E−02 | 4.436E−02 | 0.000E+00 |
| 46 | 0.000 | 0.000E+00 | −2.982E−01 | 2.572E−01 | 0.000E+00 |
| 55 | −31.077 | 0.000E+00 | −1.343E−01 | 1.290E−02 | 0.000E+00 |
| 56 | 0.000 | 0.000E+00 | −4.138E−02 | −2.007E−02 | 1.307E−02 |
| 65 | 0.000 | 0.000E+00 | −1.518E−01 | 5.626E−03 | −2.179E−04 |
| 66 | −154.596 | 0.000E+00 | −5.013E−02 | −2.812E−02 | 1.238E−02 |
| 75 | −0.589 | 0.000E+00 | −1.108E−01 | 4.651E−02 | −1.261E−02 |
| 76 | −0.839 | 0.000E+00 | −1.285E−01 | 4.069E−02 | −6.725E−03 |

| Surface | $a_{10}$ | $a_{12}$ | $a_{14}$ | $a_{16}$ | $a_{18}$ |
|---|---|---|---|---|---|
| 15 | 1.853E−01 | −9.071E−02 | 0.000E+00 | −2.332E−02 | −1.234E−02 |
| 16 | −8.834E−01 | 8.781E−01 | 0.000E+00 | 3.113E−02 | −2.043E−01 |
| 25 | 7.253E−01 | −5.656E−01 | 0.000E+00 | −1.969E−01 | −2.084E−01 |
| 26 | 1.435E−01 | −1.242E−01 | 0.000E+00 | −2.987E−01 | −5.395E−01 |
| 35 | 4.396E−01 | −5.436E−01 | 0.000E+00 | −1.310E−01 | −2.804E−02 |
| 45 | 6.047E−01 | −1.033E+00 | 0.000E+00 | −5.112E−01 | −2.084E+00 |
| 46 | −1.496E−01 | 1.318E−01 | 0.000E+00 | −4.993E−02 | 6.789E−03 |
| 55 | −1.408E−02 | −1.649E−03 | 1.399E−04 | 4.300E−04 | 1.047E−03 |
| 56 | −2.424E−03 | −6.045E−04 | 8.089E−06 | −2.906E−04 | 0.000E+00 |
| 65 | −7.585E−03 | 2.542E−03 | −5.998E−07 | −6.911E−05 | 0.000E+00 |
| 66 | −1.757E−03 | 9.993E−06 | −7.395E−11 | −7.280E−05 | 0.000E+00 |
| 75 | 5.847E−03 | −1.410E−03 | 1.888E−11 | 2.658E−05 | 0.000E+00 |
| 76 | −2.307E−04 | 2.546E−04 | 1.379E−13 | 1.661E−06 | 0.000E+00 |

| Surface | $a_{20}$ | $a_{22}$ | $a_{24}$ | $a_{26}$ | $a_{28}$ |
|---|---|---|---|---|---|
| 15 | 9.298E−02 | 0.000E+00 | −6.084E−02 | 0.000E+00 | 0.000E+00 |
| 16 | −1.079E−02 | 0.000E+00 | 6.293E−01 | 0.000E+00 | 0.000E+00 |
| 25 | −1.431E−01 | 0.000E+00 | 1.062E+00 | 0.000E+00 | 0.000E+00 |
| 26 | −6.533E−01 | 0.000E+00 | 1.669E+00 | 0.000E+00 | 0.000E+00 |
| 35 | 2.594E−02 | 0.000E+00 | −2.943E+00 | 0.000E+00 | 0.000E+00 |
| 45 | 1.306E+00 | 0.000E+00 | 1.340E+01 | 0.000E+00 | 0.000E+00 |
| 46 | 4.633E−03 | 0.000E+00 | 1.070E−02 | 0.000E+00 | 0.000E+00 |
| 55 | 8.216E−04 | 0.000E+00 | 4.181E−04 | 0.000E+00 | 1.399E−04 |
| 56 | −2.747E−05 | 0.000E+00 | 3.324E−06 | 0.000E+00 | 8.089E−06 |
| 65 | 9.935E−06 | 0.000E+00 | −7.550E−07 | 0.000E+00 | −5.998E−07 |
| 66 | 2.215E−07 | 0.000E+00 | 3.101E−08 | 0.000E+00 | −7.395E−11 |
| 75 | 3.125E−08 | 0.000E+00 | −1.618E−08 | 0.000E+00 | 1.888E−11 |
| 76 | −5.682E−10 | 0.000E+00 | −4.046E−11 | 0.000E+00 | 1.379E−13 |

Figure 4E:
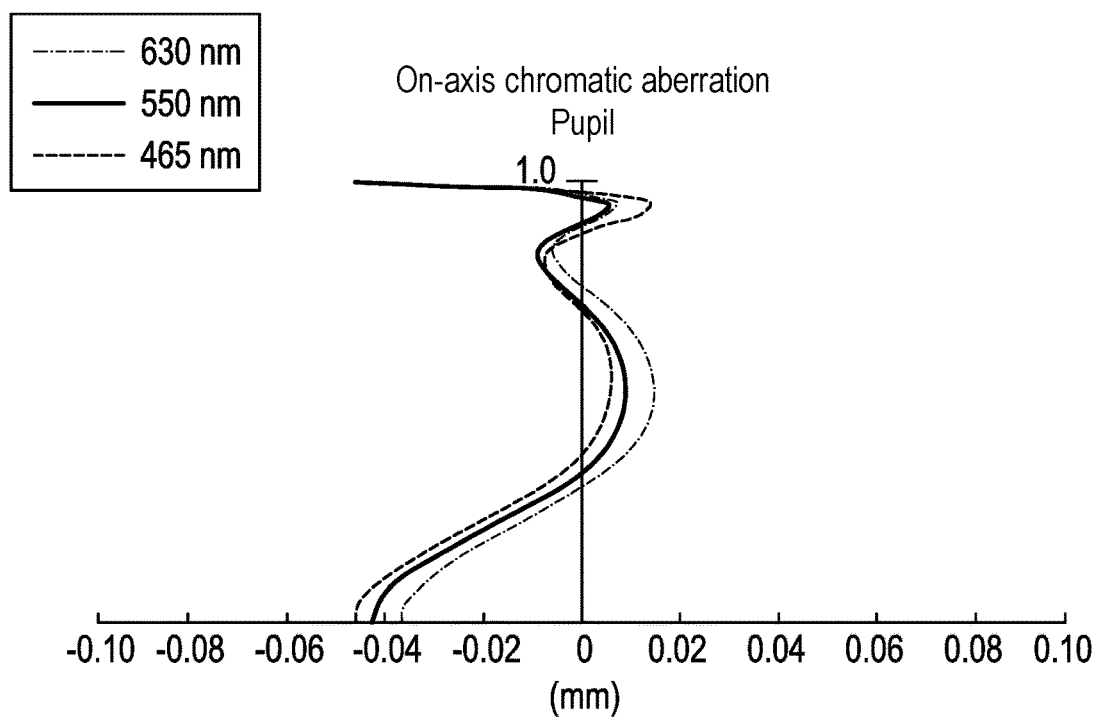
FIG. 4E is a schematic diagram of on-axis chromatic aberration of the imaging lens according to the fourth embodiment.

Please refer again to FIG. 4B to FIG. 4F. FIG. 4B is a schematic diagram of field curvature of the imaging lens according to the fourth embodiment, wherein part (A) of FIG. 4B is the tangential direction, and part (B) of FIG. 4B is the sagittal direction. FIG. 4C is a schematic diagram of distortion of the imaging lens according to the fourth embodiment, FIG. 4D is a schematic diagram of vertical axis chromatic aberration of the imaging lens according to the fourth embodiment, FIG. 4E is a schematic diagram of on-axis chromatic aberration of the imaging lens according to the fourth embodiment, and FIG. 4F is a schematic diagram of a modulation transfer function of the imaging lens according to the fourth embodiment.

between the 465 nm color light and the 630 nm color light is compared, the schematic diagram of vertical axis chromatic aberration as shown in FIG. 4D is shown, it can be seen that the vertical axis chromatic aberrations of the imaging lens 10 at different field angles almost all fall within a diffraction limit (shown as dotted lines in FIG. 4D) and fall within the range of ±3.0 μm. Please refer to FIG. 4E. When different color lights with wavelengths of 465 nm, 550 nm, and 630 nm are respectively incident on the imaging lens 10, the imaging positions on the optical axis I are different along with different aperture angles to form on-axis chromatic aberration, and the on-axis chromatic aberrations of the various color lights all fall within the range of ±0.06 mm.

Figure 4F:
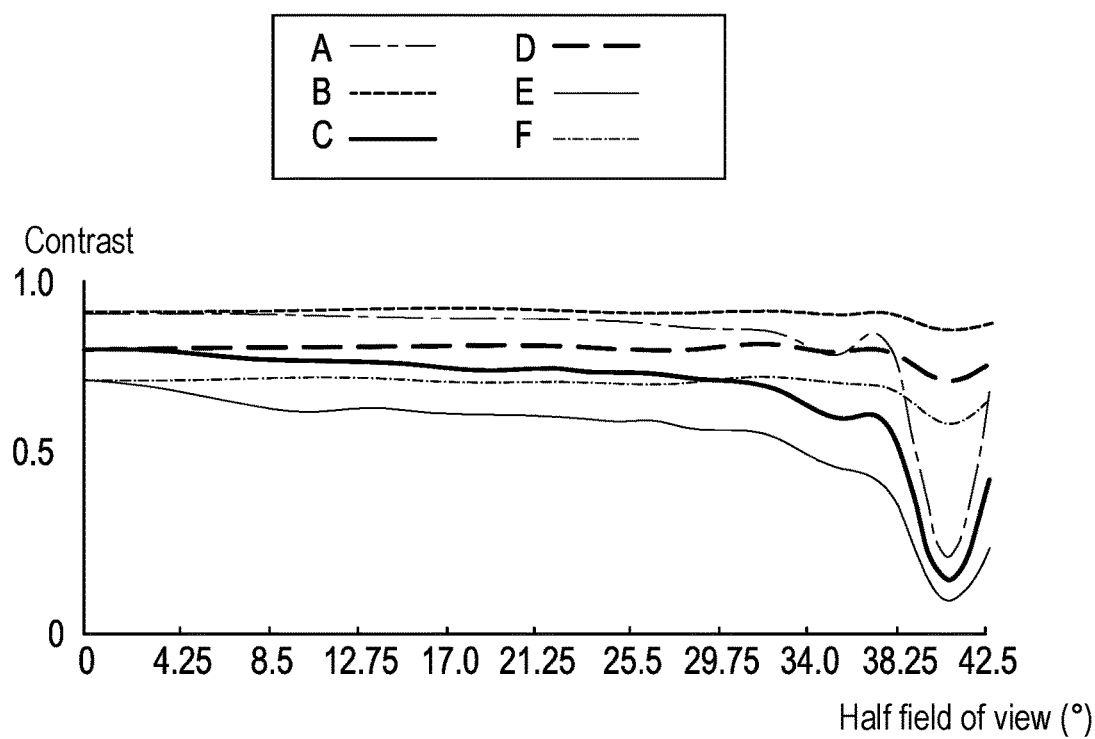
FIG. 4F is a schematic diagram of a modulation transfer function of the imaging lens according to the fourth embodiment.

Please refer to FIG. 4F. In FIG. 4F, a curve A represents the radius value of 50 lp/mm (sagittal), a curve B represents the tangent value of 50 lp/mm (tangential), a curve C represents the radius value of 100 lp/mm, a curve D represents the tangent value of 100 lp/mm, a curve E represents the radius value of 150 lp/mm, and a curve F represents the tangent value of 150 lp/mm. As shown in FIG. 4F, when the resolving power of the imaging lens 10 is respectively tested using lines with spatial frequencies of 50 lp/mm, 100 lp/mm, and 150 lp/mm, the imaging lens 10 has good resolving power at least within the half field of view of 38.25°, which means that the imaging lens 10 has high restoration ability. FIG. 4B to FIG. 4F illustrate that the imaging lens 10 according to the fourth embodiment of the disclosure as shown in FIG. 4A has good imaging quality.

Figure 5A:
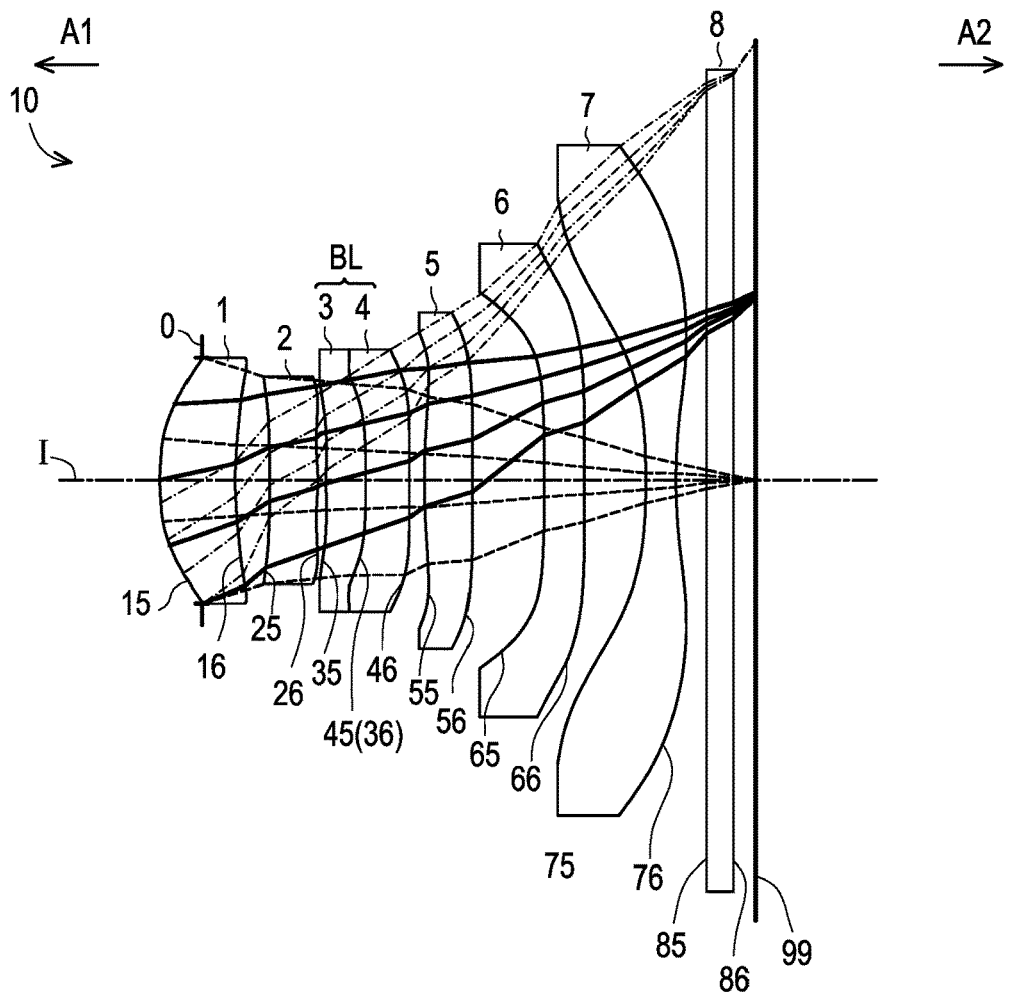
FIG. 5A is a schematic diagram of an imaging lens according to a fifth embodiment of the disclosure.

Please refer to FIG. 5A, which is a schematic diagram of an imaging lens according to a fifth embodiment of the disclosure. An imaging lens 10 according to the fifth embodiment of the disclosure sequentially includes an aperture 0, a first lens element 1, a second lens element 2, a third lens element 3, a fourth lens element 4, a fifth lens element 5, a sixth lens element 6, a seventh lens element 7, and a filter 8 from an object side A1 to an image side A2 along an optical axis I of the imaging lens 10. When light rays emitted by an object to be captured enters the imaging lens 10 and sequentially passes through the aperture 0, the first lens element 1, the second lens element 2, the third lens element 3, the fourth lens element 4, the fifth lens element 5, the sixth lens element 6, the seventh lens element 7, and the filter 8, an image is formed on an image plane 99. In the embodiment, the aperture 0 is disposed on the object side A1 of the first lens element 1.

The first lens element 1 has positive refracting power, an optical axis region of an object side surface 15 is convex, an optical axis region of an image side surface 16 is concave, and the object side surface 15 and the image side surface 16 are both aspheric surfaces. The second lens element 2 has negative refracting power, an optical axis region of an object side surface 25 is convex, an optical axis region of an image side surface 26 is concave, and the object side surface 25 and the image side surface 26 are both aspheric surfaces. An optical axis region of an object side surface 35 of the third lens element 3 is convex and is an aspheric surface. An optical axis region of an object side surface 45 of the fourth lens element 4 is concave, an optical axis region of an image side surface 46 is convex, and the object side surface 45 and the image side surface 46 are both aspheric surfaces. A cemented lens element BL formed by cementing the third lens element 3 and the fourth lens element 4 has positive refracting power. The fifth lens element 5 has positive refracting power, an optical axis region of an object side surface 55 is convex, an optical axis region of an image side surface 56 is concave, and the object side surface 55 and the image side surface 56 are both aspheric surfaces. The sixth lens element 6 has positive refracting power, an optical axis region of an object side surface 65 is convex, an optical axis region of an image side surface 66 is concave, and the object side surface 65 and the image side surface 66 are both aspheric surfaces. The seventh lens element 7 has negative refracting power, an optical axis region of an object side surface 75 is concave, an optical axis region of an image side surface 76 is concave, and the object side surface 75 and the image side surface 76 are both aspheric surfaces. A refractive index Nd of the fourth lens element 4 is 1.66, and an Abbe number is 20.4.

Other detailed optical data according to the fifth embodiment are shown in Table 9. The full field of view of the optical imaging lens 10 is 83°, the aperture value (F-number) is 1.850, the effective focal length (EFL) is 3.297 mm, and the optical imaging lens 10 satisfies a conditional expression:

$$\frac{TTL}{2ImgH} = 0.690$$

where TTL is a distance from the object side surface 15 of the first lens element 1 to the image plane 99 on the optical axis I, and ImgH is half of a diagonal length of an effective pixel region on the image plane 99, that is, an image height.

TABLE 9

| Element | Surface | Radius of curvature (mm) | Spacing (mm) | Refractive index | Abbe number |
|---|---|---|---|---|---|
| First lens element 1 | Object side surface 15 | 1.465 | 0.540 | 1.55 | 55.9 |
|  | Image side surface 16 | 3.593 | 0.230 |  |  |
| Second lens element 2 | Object side surface 25 | 17.383 | 0.344 | 1.64 | 22.4 |
|  | Image side surface 26 | 4.640 | 0.055 |  |  |
| Third lens element 3 | Object side surface 35 | 11.527 | 0.303 | 1.62 | 57.8 |
| Fourth lens element 4 | Object side surface 45 | −2.961 | 0.297 | 1.66 | 20.4 |
|  | Image side surface 46 | −287.987 | 0.104 |  |  |
| Fifth lens element 5 | Object side surface 55 | 2.715 | 0.319 | 1.62 | 26.6 |
|  | Image side surface 56 | 689.519 | 0.533 |  |  |
| Sixth lens element 6 | Object side surface 65 | 11.185 | 0.280 | 1.55 | 55.9 |
|  | Image side surface 66 | 17.837 | 0.436 |  |  |
| Seventh lens element 7 | Object side surface 75 | −3.582 | 0.201 | 1.53 | 56 |
|  | Image side surface 76 | 2.899 | 0.209 |  |  |
| Filter 8 | Object side surface 85 | Infinity | 0.210 | 1.52 | 64.1 |
|  | Image side surface 86 | Infinity | 0.150 |  |  |
|  | Image plane 99 | Infinity | 0.000 |  |  |

In Table 9, a spacing of the object side surface 15 (0.540 mm as shown in Table 9) is the thickness of the first lens element 1 on the optical axis I, a spacing of the image side surface 16 (0.230 mm as shown in Table 9) is a distance between the image side surface 16 of the first lens element 1 and the object side surface 25 of the second lens element 2 on the optical axis I, that is, a gap between the first lens element 1 and the second lens element 2 on the optical axis I, and so on.

In the embodiment, the object side surfaces 15, 25, 35, 45, 55, 65, and 75 and the image side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7 are all aspheric surfaces, and the aspheric surfaces are defined according to Formula (1) above.

The conic constant K and various aspheric surface coefficients of the above aspheric surfaces in Formula (1) of the embodiment are as shown in Table 10. The number 15 in Table 10 represents the aspheric surface coefficient of the object side surface 15 of the first lens element 1, and the other numbers may be deduced by analogy. Since the third lens element 3 and the fourth lens element 4 are cemented together through the image side surface 36 of the former and the object side surface 45 of the latter, only the object side surface 45 of the fourth lens element 4 is shown in Table 10.

Figure 5B:
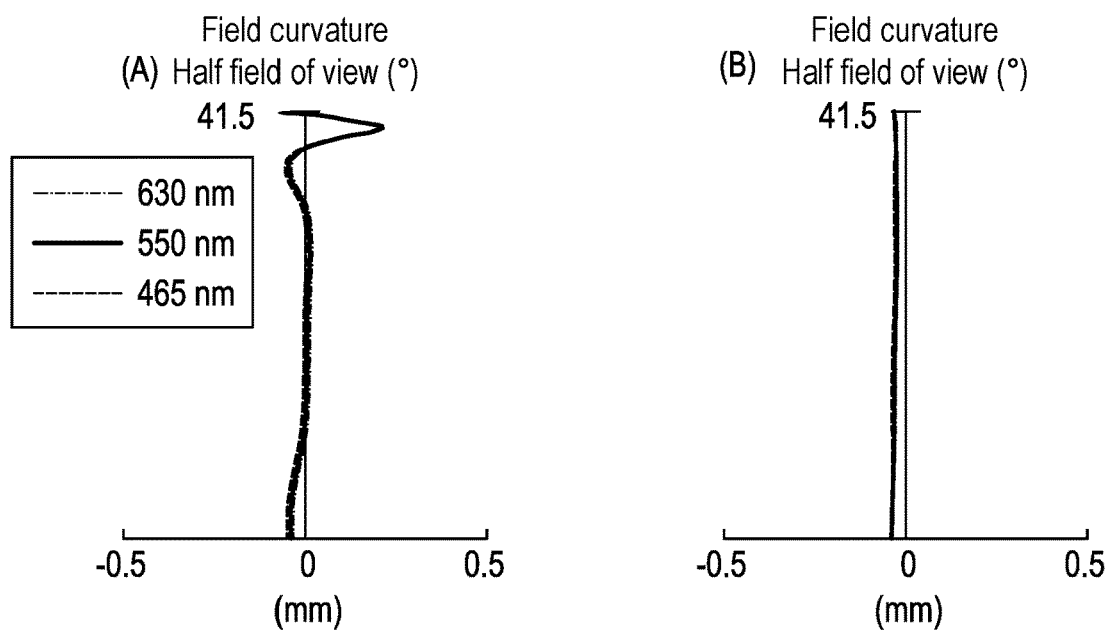
FIG. 5B is a schematic diagram of field curvature of the imaging lens according to the fifth embodiment.
Figure 5C:
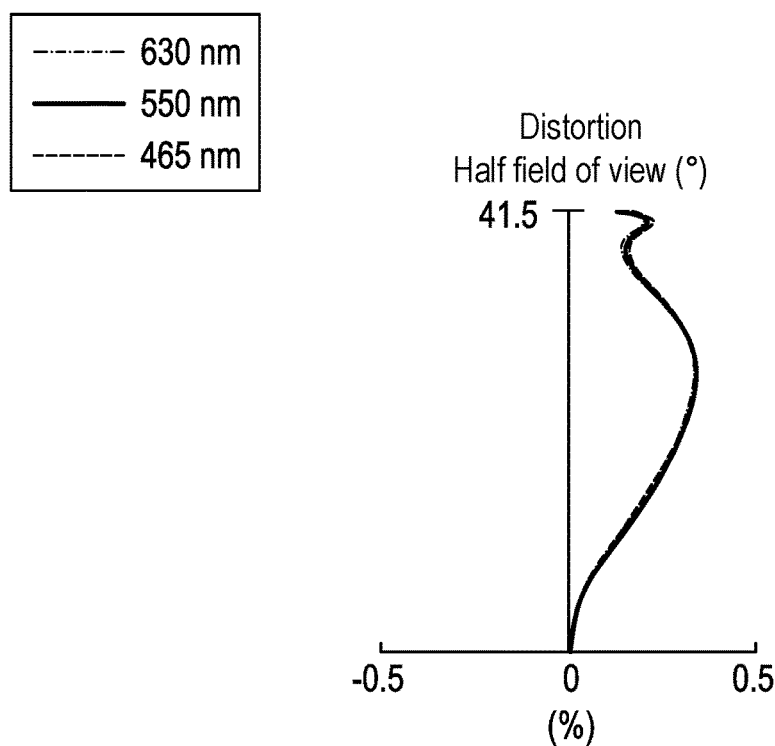
FIG. 5C is a schematic diagram of distortion of the imaging lens according to the fifth embodiment.
Figure 5D:
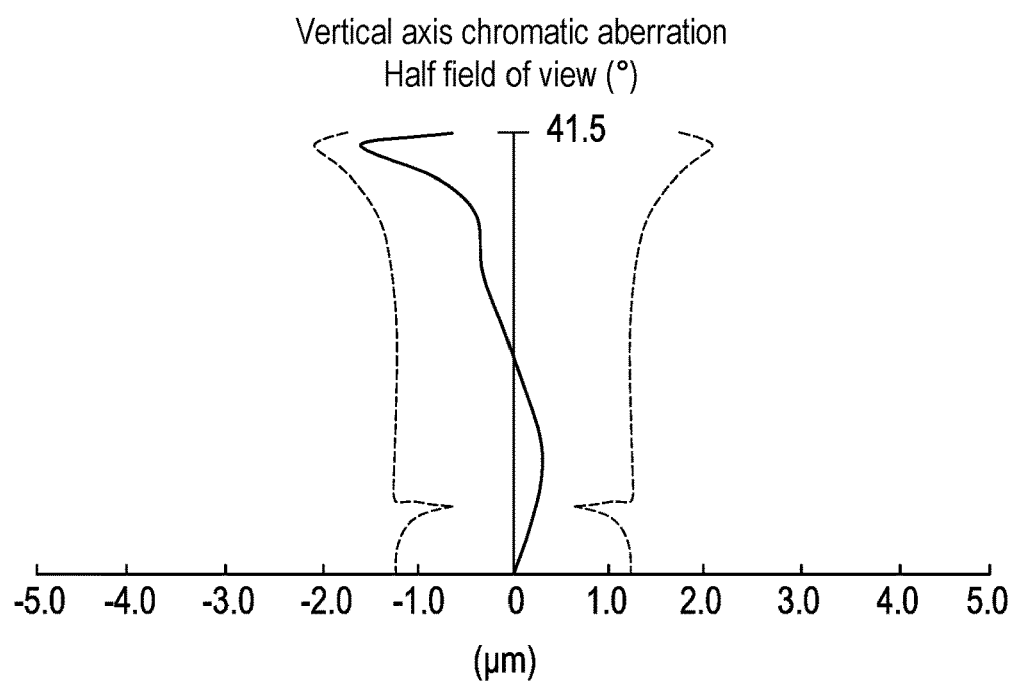
FIG. 5D is a schematic diagram of vertical axis chromatic aberration of the imaging lens according to the fifth embodiment.

FIG. 5C shows that the distortion aberration of the imaging lens 10 is maintained within the range of ±4%. FIG. 5D shows that when different color lights with wavelengths of 465 nm, 550 nm, and 630 nm are respectively incident on the imaging lens 10, the position of the 550 nm color light on the image plane 99 perpendicular to the optical axis I is used as the reference zero point, and the positional difference

TABLE 10

| Surface | K | $a_2$ | $a_4$ | $a_6$ | $a_8$ |
|---|---|---|---|---|---|
| 15 | −0.022 | 0.000E+00 | 0.000E+00 | 4.517E−02 | −1.121E−01 |
| 16 | −17.867 | 0.000E+00 | 0.000E+00 | −1.159E−01 | 4.244E−01 |
| 25 | 0.000 | 0.000E+00 | 0.000E+00 | 1.353E−01 | −4.033E−01 |
| 26 | 0.000 | 0.000E+00 | 0.000E+00 | 1.368E−01 | −2.647E−01 |
| 35 | 111.868 | 0.000E+00 | 0.000E+00 | 1.491E−01 | −4.028E−01 |
| 45 | 6.279 | 0.000E+00 | 0.000E+00 | 6.081E−02 | −2.776E−01 |
| 46 | 0.000 | 0.000E+00 | 0.000E+00 | 2.555E−01 | −1.063E−01 |
| 55 | −31.001 | 0.000E+00 | 0.000E+00 | 1.308E−02 | −3.155E−03 |
| 56 | 0.000 | 0.000E+00 | 0.000E+00 | −2.032E−02 | 1.311E−02 |
| 65 | 0.000 | 0.000E+00 | 0.000E+00 | 3.278E−03 | −2.067E−03 |
| 66 | 37.870 | 0.000E+00 | 0.000E+00 | −2.807E−02 | 1.238E−02 |
| 75 | −0.828 | 0.000E+00 | 0.000E+00 | 4.664E−02 | −1.260E−02 |
| 76 | −1.082 | 0.000E+00 | 0.000E+00 | 4.028E−02 | −6.714E−03 |

| Surface | $a_{10}$ | $a_{12}$ | $a_{14}$ | $a_{16}$ | $a_{18}$ |
|---|---|---|---|---|---|
| 15 | 1.866E−01 | −8.900E−02 | 0.000E+00 | −2.361E−02 | −1.453E−02 |
| 16 | −8.844E−01 | 8.731E−01 | 0.000E+00 | 6.593E−03 | −2.410E−01 |
| 25 | 7.156E−01 | −5.806E−01 | 0.000E+00 | −2.081E−01 | −2.042E−01 |
| 26 | 1.386E−01 | −1.397E−01 | 0.000E+00 | −3.531E−01 | −6.036E−01 |
| 35 | 4.294E−01 | −5.547E−01 | 0.000E+00 | −1.150E−01 | 1.109E−03 |
| 45 | 5.671E−01 | −1.144E+00 | 0.000E+00 | −6.603E−01 | −1.940E+00 |
| 46 | −1.508E−01 | 1.311E−01 | 0.000E+00 | −4.855E−02 | 9.382E−03 |
| 55 | −1.379E−02 | 0.000E+00 | 2.440E−04 | 1.110E−03 | 1.522E−03 |
| 56 | −2.457E−03 | 0.000E+00 | 3.006E−06 | −2.982E−04 | −6.984E−05 |
| 65 | −8.464E−03 | 0.000E+00 | 4.152E−07 | −7.999E−05 | 1.685E−05 |
| 66 | −1.714E−03 | 0.000E+00 | −1.664E−09 | −7.145E−05 | 9.005E−06 |
| 75 | 5.849E−03 | 0.000E+00 | −1.743E−10 | 2.658E−05 | −2.249E−06 |
| 76 | −2.209E−04 | 0.000E+00 | −4.749E−13 | 1.670E−06 | −2.358E−08 |

| Surface | $a_{20}$ | $a_{22}$ | $a_{24}$ | $a_{26}$ | $a_{28}$ |
|---|---|---|---|---|---|
| 15 | 0.000E+00 | 3.563E−02 | 0.000E+00 | 0.000E+00 | 0.000E+00 |
| 16 | 0.000E+00 | −3.650E−01 | 0.000E+00 | 0.000E+00 | 0.000E+00 |
| 25 | 0.000E+00 | 1.143E−01 | 0.000E+00 | 0.000E+00 | 0.000E+00 |
| 26 | 0.000E+00 | −1.043E−01 | 0.000E+00 | 0.000E+00 | 0.000E+00 |
| 35 | 0.000E+00 | −5.999E−01 | 0.000E+00 | 0.000E+00 | 0.000E+00 |
| 45 | 0.000E+00 | 8.377E+00 | 0.000E+00 | 0.000E+00 | 0.000E+00 |
| 46 | 0.000E+00 | 5.274E−03 | 0.000E+00 | 0.000E+00 | 0.000E+00 |
| 55 | 3.024E−04 | 7.392E−04 | 0.000E+00 | 2.440E−04 | 3.024E−04 |
| 56 | −1.458E−06 | 3.561E−07 | 0.000E+00 | 3.006E−06 | −1.458E−06 |
| 65 | 5.685E−08 | 7.458E−06 | 0.000E+00 | 4.152E−07 | 5.685E−08 |
| 66 | −1.897E−09 | 6.768E−08 | 0.000E+00 | −1.664E−09 | −1.897E−09 |
| 75 | 2.352E−11 | 7.714E−08 | 0.000E+00 | −1.743E−10 | 2.352E−11 |
| 76 | −5.303E−13 | −1.836E−10 | 0.000E+00 | −4.749E−13 | −5.303E−13 |

Figure 5E:
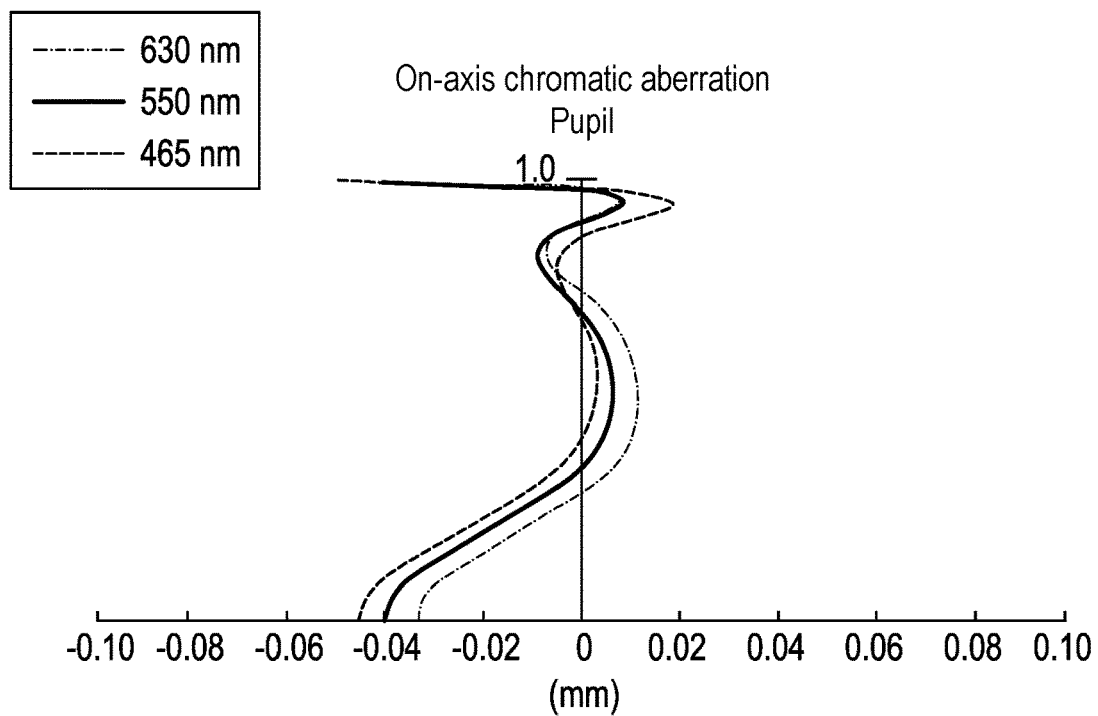
FIG. 5E is a schematic diagram of on-axis chromatic aberration of the imaging lens according to the fifth embodiment.
Figure 5F:
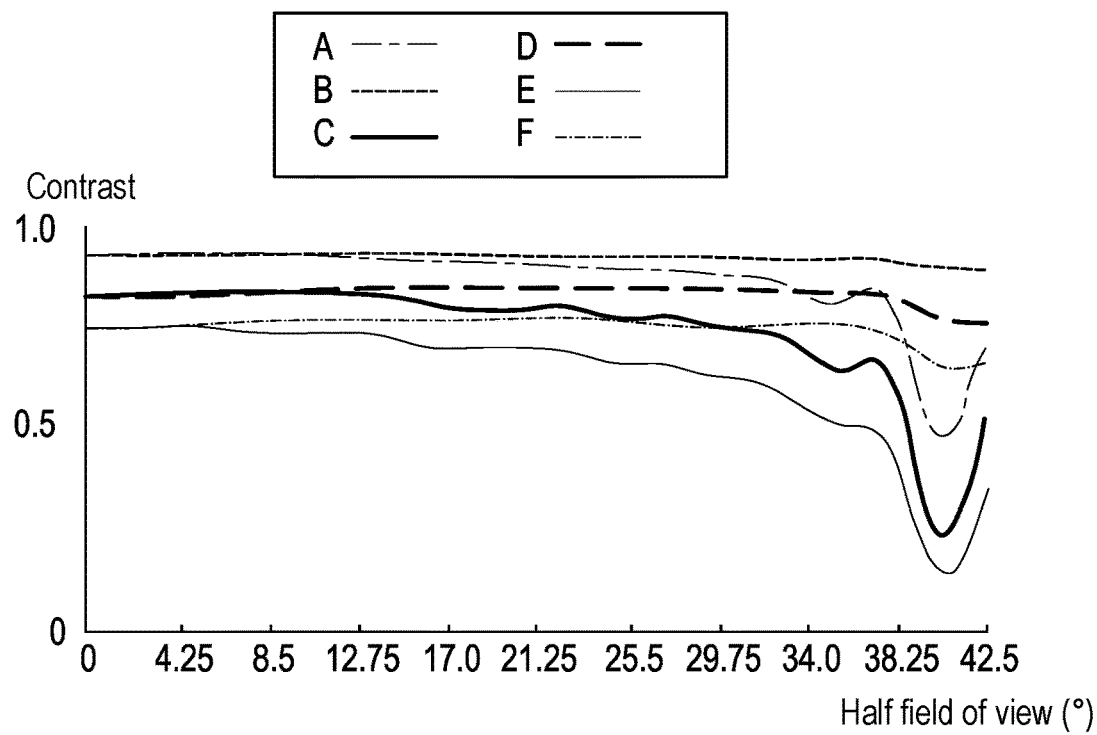
FIG. 5F is a schematic diagram of a modulation transfer function of the imaging lens according to the fifth embodiment.

Please refer to FIG. 5B to FIG. 5F. FIG. 5B is a schematic diagram of field curvature of the imaging lens according to the fifth embodiment, wherein part (A) of FIG. 5B is the tangential direction, and part (B) of FIG. 5B is the sagittal direction. FIG. 5C is a schematic diagram of distortion of the imaging lens according to the fifth embodiment, FIG. 5D is a schematic diagram of vertical axis chromatic aberration of the imaging lens according to the fifth embodiment, FIG. 5E is a schematic diagram of on-axis chromatic aberration of the imaging lens according to the fifth embodiment, and FIG. 5F is a schematic diagram of a modulation transfer function according to the fifth embodiment.

As shown in FIG. 5B. When different color lights with wavelengths of 465 nm, 550 nm, and 630 nm are respectively incident on the imaging lens 10, the field curvatures of each color light at different field angles all fall within the range of ±0.30 mm. The distortion aberration diagram of between the 465 nm color light and the 630 nm color light is compared, the schematic diagram of vertical axis chromatic aberration as shown in FIG. 5D is shown, it can be seen that the vertical axis chromatic aberrations of the imaging lens 10 at different field angles all fall within a diffraction limit (shown as dashed lines in FIG. 5D) and fall within the range of ±2.0 μm. Please refer to FIG. 5E. When different color lights with wavelengths of 465 nm, 550 nm, and 630 nm are respectively incident on the imaging lens 10, the imaging positions on the optical axis I are different along with different aperture angles to form on-axis chromatic aberration, and the on-axis chromatic aberrations of the various color lights all fall within the range of ±0.06 mm.

Please refer to FIG. 5F. In FIG. 5F, a curve A represents the radius value of 50 lp/mm (sagittal), a curve B represents the tangent value of 50 lp/mm (tangential), a curve C represents the radius value of 100 lp/mm, a curve D represents the tangent value of 100 lp/mm, a curve E represents the radius value of 150 lp/mm, and a curve F represents the tangent value of 150 lp/mm. As shown in FIG. 5F, when the resolving power of the imaging lens 10 is respectively tested using lines with spatial frequencies of 50 lp/mm, 100 lp/mm, and 150 lp/mm, the imaging lens 10 has good resolving power at least within the half field of view of 37.35°, which means that the imaging lens 10 has high restoration ability. FIG. 5B to FIG. 5F illustrate that the imaging lens 10 according to the fifth embodiment of the disclosure as shown in FIG. 5A has good imaging quality.

Figure 6A:
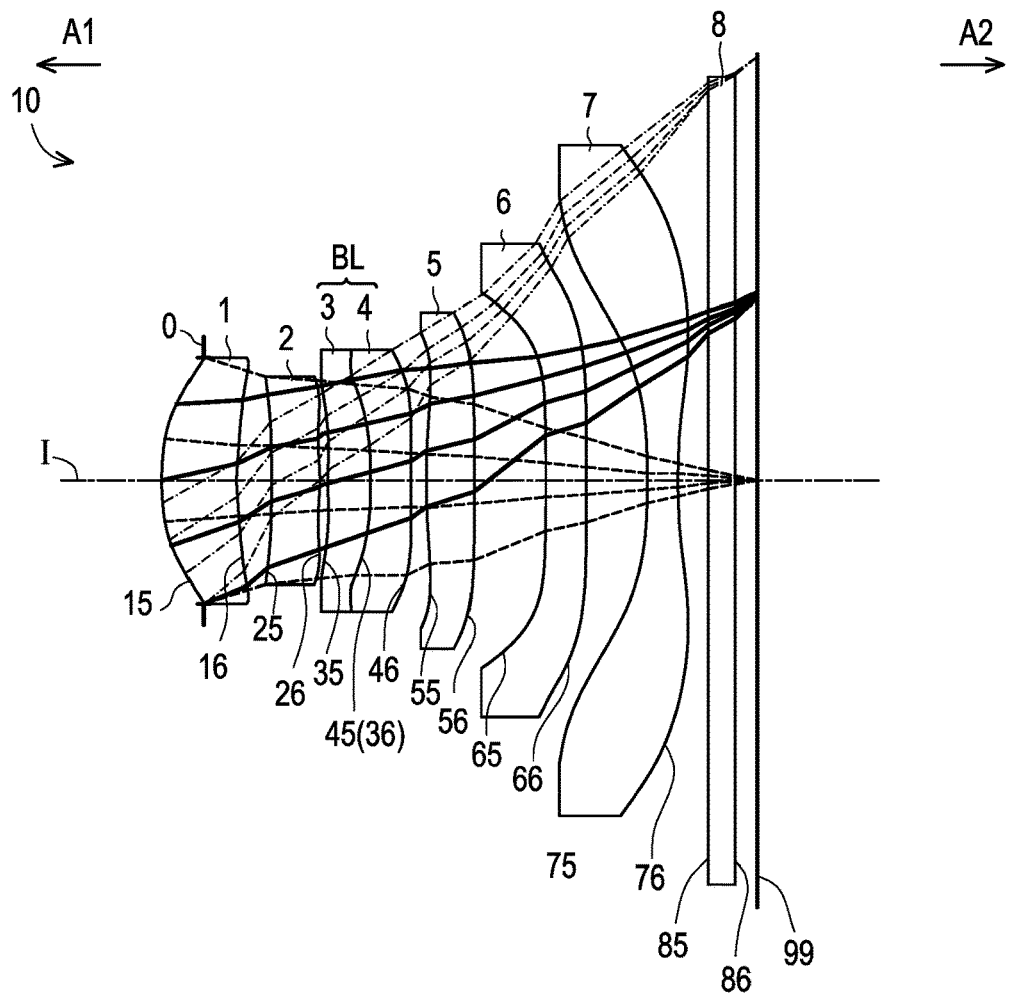
FIG. 6A is a schematic diagram of an imaging lens according to a sixth embodiment of the disclosure.

Please refer to FIG. 6A, which is a schematic diagram of an imaging lens according to a sixth embodiment of the disclosure. An imaging lens 10 according to the sixth embodiment of the disclosure sequentially includes an aperture 0, a first lens element 1, a second lens element 2, a third lens element 3, a fourth lens element 4, a fifth lens element 5, a sixth lens element 6, a seventh lens element 7, and a filter 8 from an object side A1 to an image side A2 along an optical axis I of the imaging lens 10. When light rays emitted by an object to be captured enters the imaging lens 10 and sequentially passes through the aperture 0, the first lens element 1, the second lens element 2, the third lens element 3, the fourth lens element 4, the fifth lens element 5, the sixth lens element 6, the seventh lens element 7, and the filter 8, an image is formed on an image plane 99. In the embodiment, the aperture 0 is disposed on the object side A1 of the first lens element 1.

The first lens element 1 has positive refracting power, an optical axis region of an object side surface 15 is convex, an optical axis region of an image side surface 16 is concave, and the object side surface 15 and the image side surface 16 are both aspheric surfaces. The second lens element 2 has negative refracting power, an optical axis region of an object side surface 25 is convex, an optical axis region of an image side surface 26 is concave, and the object side surface 25 and the image side surface 26 are both aspheric surfaces. An optical axis region of an object side surface 35 of the third lens element 3 is convex and is an aspheric surface. An optical axis region of an object side surface 45 of the fourth lens element 4 is concave, an optical axis region of an image side surface 46 is convex, and the object side surface 45 and the image side surface 46 are both aspheric surfaces. A cemented lens element BL formed by cementing the third lens element 3 and the fourth lens element 4 has positive refracting power. The fifth lens element 5 has positive refracting power, an optical axis region of an object side surface 55 is convex, an optical axis region of an image side surface 56 is convex, and the object side surface 55 and the image side surface 56 are both aspheric surfaces. The sixth lens element 6 has positive refracting power, an optical axis region of an object side surface 65 is convex, an optical axis region of an image side surface 66 is concave, and the object side surface 65 and the image side surface 66 are both aspheric surfaces. The seventh lens element 7 has negative refracting power, an optical axis region of an object side surface 75 is concave, an optical axis region of an image side surface 76 is concave, and the object side surface 75 and the image side surface 76 are both aspheric surfaces. A refractive index Nd of the fourth lens element 4 is 1.66, and an Abbe number is 20.4.

Other detailed optical data according to the sixth embodiment are shown in Table 11. The full field of view of the optical imaging lens 10 is 83°, the aperture value (F-number) is 1.850, the effective focal length (EFL) is 3.285 mm, and the optical imaging lens 10 satisfies a conditional expression:

$$\frac{TTL}{2ImgH} = 0.705$$

where TTL is a distance from the object side surface 15 of the first lens element 1 to the image plane 99 on the optical axis I, and ImgH is half of a diagonal length of an effective pixel region on the image plane 99, that is, an image height.

TABLE 11

| Element | Surface | Radius of curvature (mm) | Spacing (mm) | Refractive index | Abbe number |
|---|---|---|---|---|---|
| First lens element 1 | Object side surface 15 | 1.469 | 0.542 | 1.545 | 55.930 |
| | Image side surface 16 | 3.605 | 0.230 | | |
| Second lens element 2 | Object side surface 25 | 16.477 | 0.348 | 1.642 | 22.410 |
| | Image side surface 26 | 4.561 | 0.056 | | |
| Third lens element 3 | Object side surface 35 | 11.568 | 0.312 | 1.620 | 57.980 |
| Fourth lens element 4 | Object side surface 45 | −2.922 | 0.289 | 1.660 | 20.400 |
| | Image side surface 46 | −241.823 | 0.100 | | |
| Fifth lens element 5 | Object side surface 55 | 2.697 | 0.323 | 1.608 | 26.900 |
| | Image side surface 56 | −516.703 | 0.534 | | |
| Sixth lens element 6 | Object side surface 65 | 10.669 | 0.285 | 1.545 | 55.930 |
| | Image side surface 66 | 32.166 | 0.434 | | |
| Seventh lens element 7 | Object side surface 75 | −3.435 | 0.196 | 1.545 | 55.930 |
| | Image side surface 76 | 2.877 | 0.203 | | |
| Filter 8 | Object side surface 85 | Infinity | 0.210 | 1.520 | 64.200 |
| | Image side surface 86 | Infinity | 0.150 | | |
| | Image plane 99 | Infinity | 0.000 | | |

In Table 11, a spacing of the object side surface 15 (0.542 mm as shown in Table 11) is the thickness of the first lens element 1 on the optical axis I, a spacing of the image side surface 16 (0.230 mm as shown in Table 11) is a distance between the image side surface 16 of the first lens element 1 and the object side surface 25 of the second lens element 2 on the optical axis I, that is, a gap between the first lens element 1 and the second lens element 2 on the optical axis I, and so on.

In the embodiment, the object side surfaces 15, 25, 35, 45, 55, 65, and 75 and the image side surfaces 16, 26, 36, 46, 56, 66, and 76 of the first lens element 1, the second lens element 2, the third lens element 3, the fourth lens element 4, the fifth lens element 5, the sixth lens element 6, and the seventh lens element 7 are all aspheric surfaces, and the aspheric surfaces are defined according to Formula (1) above.

The conic constant K and various aspheric surface coefficients of the above aspheric surfaces in Formula (1) of the embodiment are as shown in Table 12. The number 15 in Table 12 represents the aspheric surface coefficient of the object side surface 15 of the first lens element 1, and the other numbers may be deduced by analogy. Since the third lens element 3 and the fourth lens element 4 are cemented together through the image side surface 36 of the former and the object side surface 45 of the latter, only the object side surface 45 of the fourth lens element 4 is shown in Table 12.

TABLE 12

| Surface | K | $a_2$ | $a_4$ | $a_6$ | $a_8$ |
|---|---|---|---|---|---|
| 15 | −0.013 | 0.000E+00 | 0.000E+00 | 4.508E−02 | −1.123E−01 |
| 16 | −17.819 | 0.000E+00 | 0.000E+00 | −1.150E−01 | 4.262E−01 |
| 25 | 0.000 | 0.000E+00 | 0.000E+00 | 1.371E−01 | −4.014E−01 |
| 26 | 0.000 | 0.000E+00 | 0.000E+00 | 1.359E−01 | −2.654E−01 |
| 35 | 109.400 | 0.000E+00 | 0.000E+00 | 1.478E−01 | −4.093E−01 |
| 45 | 6.395 | 0.000E+00 | 0.000E+00 | 6.530E−02 | −2.840E−01 |
| 46 | 0.000 | 0.000E+00 | 0.000E+00 | 2.547E−01 | −1.074E−01 |
| 55 | −30.754 | 0.000E+00 | 0.000E+00 | 1.307E−02 | −3.138E−03 |
| 56 | 0.000 | 0.000E+00 | 0.000E+00 | −2.082E−02 | 1.297E−02 |
| 65 | 0.000 | 0.000E+00 | 0.000E+00 | 2.468E−03 | −2.009E−03 |
| 66 | 0.000 | 0.000E+00 | 0.000E+00 | −2.790E−02 | 1.244E−02 |
| 75 | −1.189 | 0.000E+00 | 0.000E+00 | 4.674E−02 | −1.259E−02 |
| 76 | −1.049 | 0.000E+00 | 0.000E+00 | 4.006E−02 | −6.752E−03 |

| Surface | $a_{10}$ | $a_{12}$ | $a_{14}$ | $a_{16}$ | $a_{18}$ |
|---|---|---|---|---|---|
| 15 | 1.871E−01 | 0.000E+00 | 0.000E+00 | −2.327E−02 | −1.522E−02 |
| 16 | −8.825E−01 | 0.000E+00 | 0.000E+00 | −2.616E−03 | −2.569E−01 |
| 25 | 7.144E−01 | 0.000E+00 | 0.000E+00 | −2.273E−01 | −2.160E−01 |
| 26 | 1.358E−01 | 0.000E+00 | 0.000E+00 | −3.903E−01 | −6.580E−01 |
| 35 | 4.178E−01 | 0.000E+00 | 0.000E+00 | −9.777E−02 | 3.388E−02 |
| 45 | 5.543E−01 | 0.000E+00 | 0.000E+00 | −3.658E−01 | −1.333E+00 |
| 46 | −1.518E−01 | 0.000E+00 | 0.000E+00 | −4.853E−02 | 9.549E−03 |
| 55 | −1.345E−02 | 8.637E−05 | 3.568E−04 | 1.307E−02 | 1.386E−03 |
| 56 | −2.500E−03 | 2.659E−06 | −2.888E−06 | −2.082E−02 | −8.724E−05 |
| 65 | −8.641E−03 | 1.456E−06 | 3.212E−06 | 2.468E−03 | −3.115E−05 |
| 66 | −1.694E−03 | −6.728E−09 | −3.978E−09 | −2.790E−02 | 9.027E−06 |
| 75 | 5.848E−03 | −1.796E−10 | 2.319E−11 | 4.674E−02 | −2.254E−06 |
| 76 | −2.244E−04 | −2.098E−12 | −1.024E−12 | 4.006E−02 | −1.954E−08 |

| Surface | $a_{20}$ | $a_{22}$ | $a_{24}$ | $a_{26}$ | $a_{28}$ |
|---|---|---|---|---|---|
| 15 | 0.000E+00 | 3.373E−02 | −6.013E−02 | 0.000E+00 | 0.000E+00 |
| 16 | 0.000E+00 | −3.759E−01 | 7.371E−01 | 0.000E+00 | 0.000E+00 |
| 25 | 0.000E+00 | 1.303E−01 | 7.640E−01 | 0.000E+00 | 0.000E+00 |
| 26 | 0.000E+00 | −2.140E−01 | 1.866E+00 | 0.000E+00 | 0.000E+00 |
| 35 | 0.000E+00 | −8.263E−01 | −5.198E+00 | 0.000E+00 | 0.000E+00 |
| 45 | 0.000E+00 | 6.541E+00 | 1.114E+01 | 0.000E+00 | 0.000E+00 |
| 46 | 0.000E+00 | 1.940E−03 | 6.321E−03 | 0.000E+00 | 0.000E+00 |
| 55 | 0.000E+00 | 5.157E−04 | 6.158E−05 | 8.637E−05 | 3.568E−04 |
| 56 | 0.000E+00 | 3.719E−07 | 1.705E−05 | 2.659E−06 | −2.888E−06 |
| 65 | 0.000E+00 | −7.744E−06 | −4.044E−06 | 1.456E−06 | 3.212E−06 |
| 66 | 0.000E+00 | 4.972E−08 | 1.289E−08 | −6.728E−09 | −3.978E−09 |
| 75 | 0.000E+00 | 7.695E−08 | −1.615E−08 | −1.796E−10 | 2.319E−11 |
| 76 | 0.000E+00 | −1.418E−10 | −5.403E−11 | −2.098E−12 | −1.024E−12 |

Figure 6B:
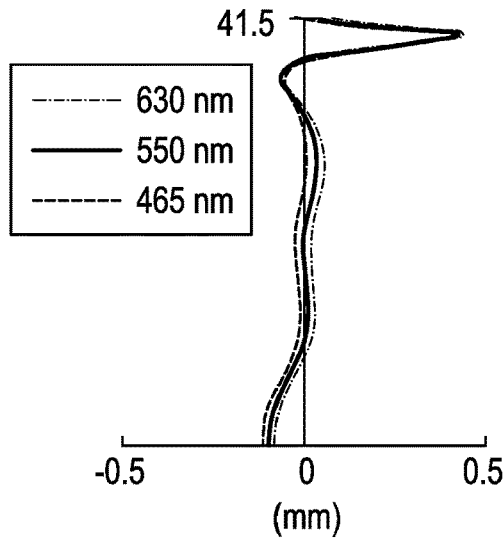
FIG. 6B is a schematic diagram of field curvature of the imaging lens according to the sixth embodiment.
Figure 6B:
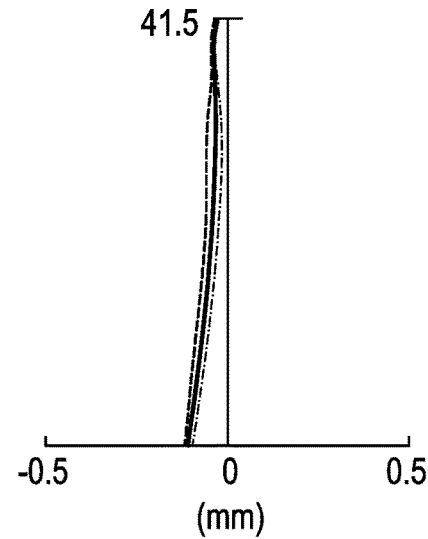
Figure 6C:
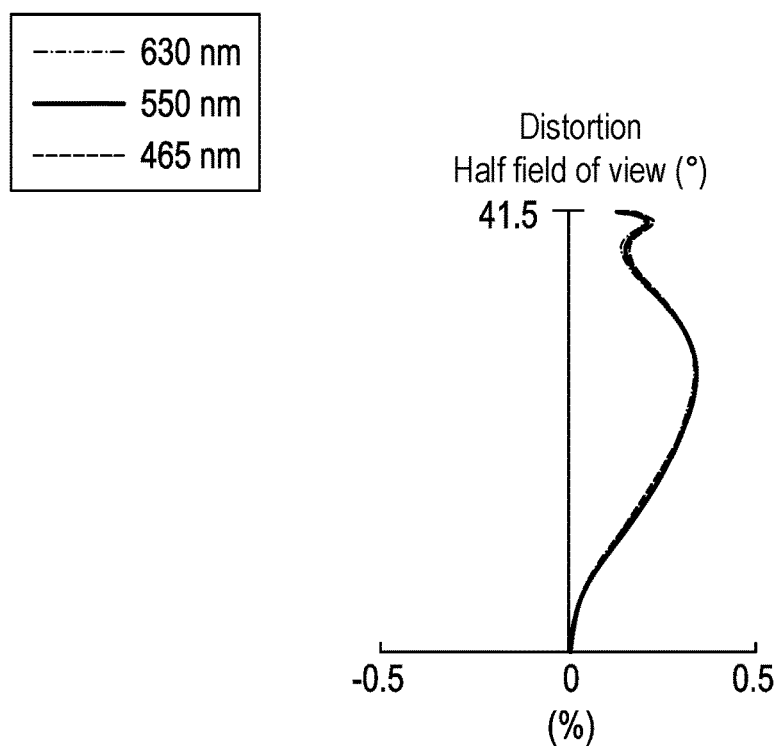
FIG. 6C is a schematic diagram of distortion of the imaging lens according to the sixth embodiment.
Figure 6D:
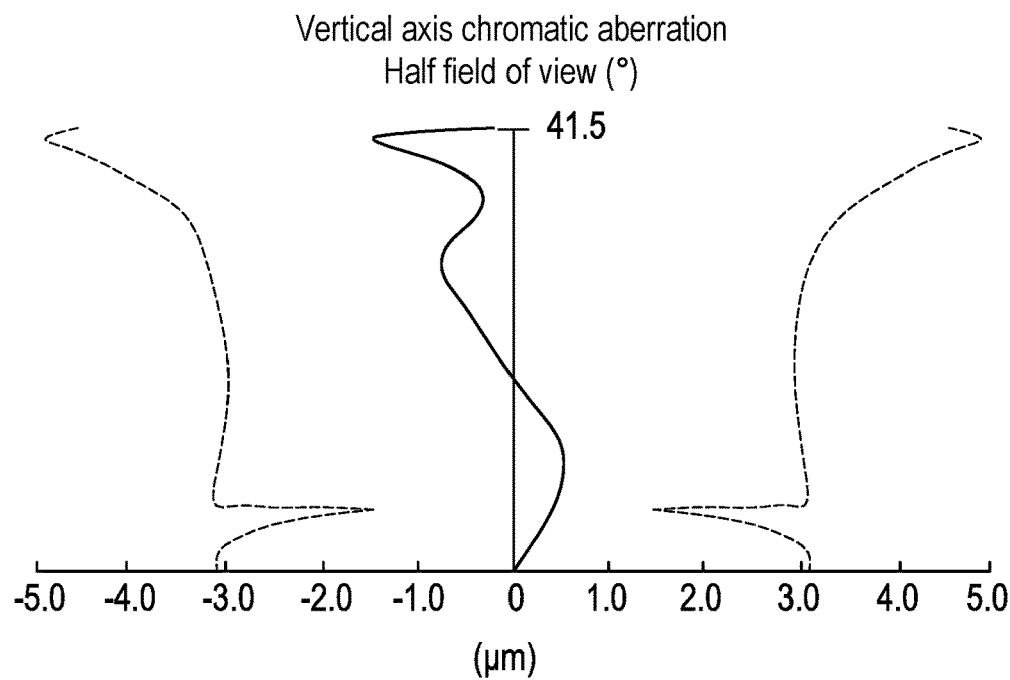
FIG. 6D is a schematic diagram of vertical axis chromatic aberration of the imaging lens according to the sixth embodiment.
Figure 6E:
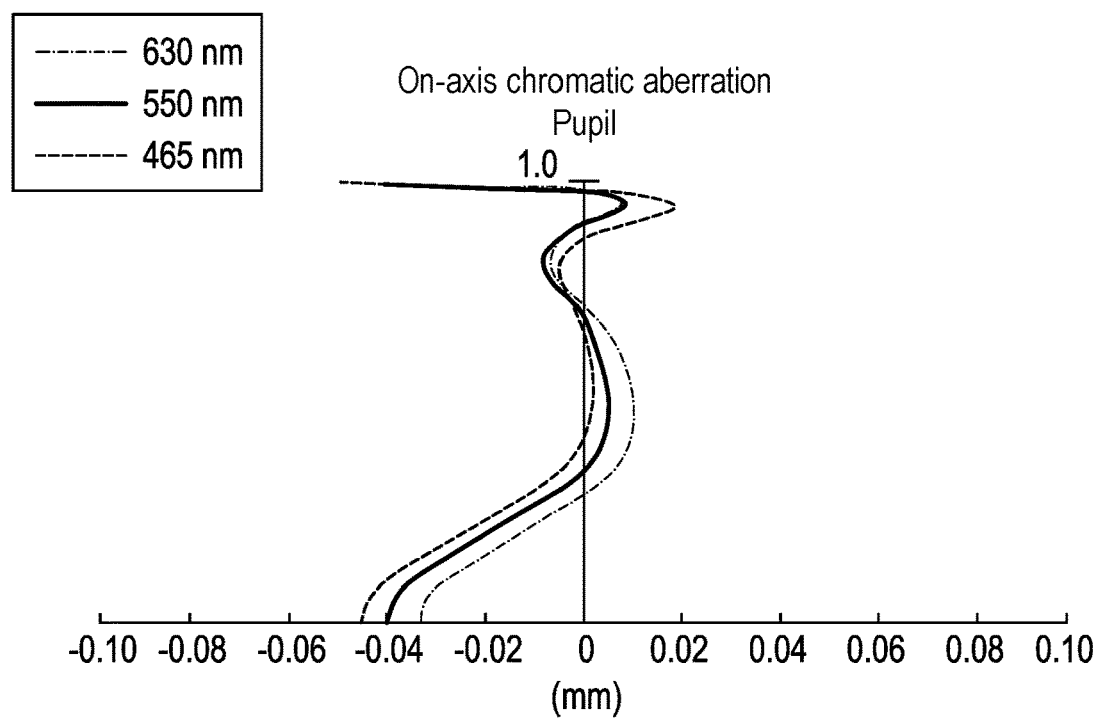
FIG. 6E is a schematic diagram of on-axis chromatic aberration of the imaging lens according to the sixth embodiment.

Please refer again to FIG. 6B to FIG. 6F. FIG. 6B is a schematic diagram of field curvature of the imaging lens according to the sixth embodiment, wherein part (A) of FIG. 6B is the tangential direction, and part (B) of FIG. 6B is the sagittal direction. FIG. 6C is a schematic diagram of distortion of the imaging lens according to the sixth embodiment, FIG. 6D is a schematic diagram of vertical axis chromatic aberration of the imaging lens according to the sixth embodiment, FIG. 6E is a schematic diagram of on-axis chromatic aberration of the imaging lens according to the sixth embodiment, and FIG. 6F is a schematic diagram of a modulation transfer function of the imaging lens according to the sixth embodiment.

As shown in FIG. 6B. When different color lights with wavelengths of 465 nm, 550 nm, and 630 nm are respectively incident on the imaging lens 10, the field curvatures of each color light at different field angles all fall within the range of ±0.20 mm. The distortion aberration diagram of FIG. 6C shows that the distortion aberration of the imaging lens 10 is maintained within the range of ±4%. FIG. 6D shows that when different color lights with wavelengths of 465 nm, 550 nm, and 630 nm are respectively incident on the imaging lens 10, the position of the 550 nm color light is used as the reference zero point on the image plane 99 perpendicular to the optical axis I, and the positional difference between the 465 nm color light and the 630 nm color light is compared, the schematic diagram of vertical axis chromatic aberration as shown in FIG. 6D is shown, it can be seen that the vertical axis chromatic aberrations of the imaging lens 10 at different field angles all fall within a diffraction limit (shown as dashed lines in FIG. 6D) and fall within the range of ±0.8 μm. Please refer to FIG. 6E. When different color lights with wavelengths of 465 nm, 550 nm, and 630 nm are respectively incident on the imaging lens 10, the imaging positions on the optical axis I are different along with different aperture angles to form on-axis chromatic aberration, and the on-axis chromatic aberrations of the various color lights all fall within the range of ±0.06 mm.

Figure 6F:
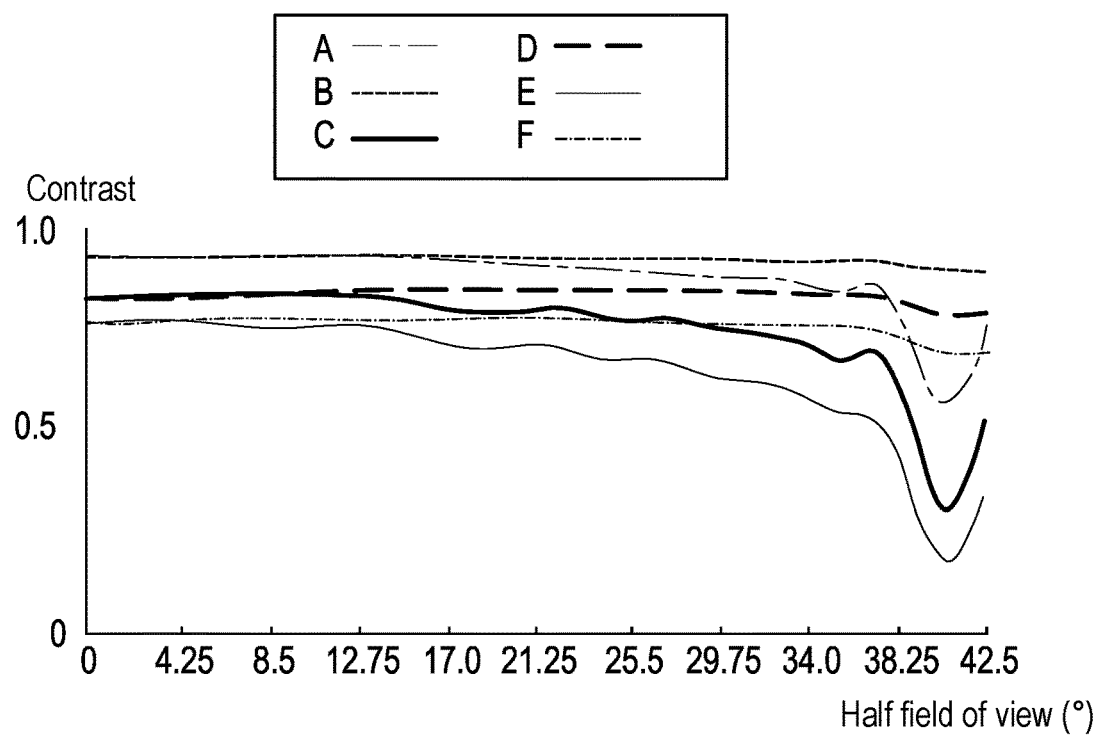
FIG. 6F is a schematic diagram of a modulation transfer function of the imaging lens according to the sixth embodiment.

Please refer to FIG. 6F. In FIG. 6F, a curve A represents the radius value of 50 lp/mm (sagittal), a curve B represents the tangent value of 50 lp/mm (tangential), a curve C represents the radius value of 100 lp/mm, a curve D represents the tangent value of 100 lp/mm, a curve E represents the radius value of 150 lp/mm, and a curve F represents the tangent value of 150 lp/mm. As shown in FIG. 6F, when the resolving power of the imaging lens 10 is respectively tested using lines with spatial frequencies of 50 lp/mm, 100 lp/mm, and 150 lp/mm, the imaging lens 10 has good resolving power at least within the half field of view of 37.35°, which means that the imaging lens 10 has high restoration ability.

FIG. 6B to FIG. 6F illustrate that the imaging lens 10 according to the sixth embodiment of the disclosure as shown in FIG. 6A has good imaging quality.

The imaging lens 10 of each of the above embodiments satisfies a conditional expression:

$$-7.07 < \frac{(L2R1) \times (L2R2)}{L2R2 - L2R1} < -5.52$$

where L2R1 is a radius of curvature of the object side surface 25 of the second lens element 2 in the optical axis region, and L2R2 is a radius of curvature of the image side surface 26 of the second lens element 2 in the optical axis region.

The imaging lens 10 of each of the above embodiments satisfies a conditional expression:

$$2.437 < \frac{(L5R1) \times (L5R2)}{L5R2 - L5R1} < 3.16$$

where L5R1 is a radius of curvature of the object side surface 55 of the fifth lens element 5 in the optical axis region, and L5R2 is a radius of curvature of the image side surface 56 of the fifth lens element 5 in the optical axis region.

The imaging lens 10 of each of the above embodiments satisfies a conditional expression:

$$4.81 < \frac{(L6R1) \times (L6R2)}{L6R2 - L6R1} < 86.96$$

where L6R1 is a radius of curvature of the object side surface 65 of the sixth lens element 6 in the optical axis region, and L6R2 is a radius of curvature of the image side surface 66 of the sixth lens element 6 in the optical axis region.

The imaging lens 10 of each of the above embodiments satisfies a conditional expression:

$$0.8 < \frac{(L3R1) + (L4R2)}{(-L3R1) + (L4R2)} < 1.16$$

where L3R1 is a radius of curvature of the object side surface 35 of the third lens element 3 in the optical axis region, and LAR2 is a radius of curvature of the image side surface 46 of the fourth lens element 4 in the optical axis region.

The focal lengths of the second lens element 2 in the first embodiment to the sixth embodiment of the disclosure are respectively −9.354 mm, −9.385 mm, −9.683 mm, −9.782 mm, −9.868 mm, and −9.841 mm. In addition, the effective focal lengths EFL of the optical imaging lens 10 in the first embodiment to the sixth embodiment are respectively 3.385 mm, 3.393 mm, 3.374 mm, 3.310 mm, 3.297 mm, and 3.285 mm. Therefore, the imaging lens 10 of each of the above embodiments satisfies a conditional expression:

$$-3.08 < \frac{FL2}{EFL} < -2.5$$

where FL2 is the focal length of the second lens element 2, and EFL is the effective focal length of the imaging lens 10.

The focal lengths of the fifth lens element 5 in the first embodiment to the sixth embodiment of the disclosure are respectively 4.404 mm, 4.264 mm, 4.289 mm, 4.279 mm, 4.341 mm, and 4.380 mm. In addition, the effective focal lengths EFL of the optical imaging lens 10 in the first embodiment to the sixth embodiment are respectively 3.385 mm, 3.393 mm, 3.374 mm, 3.310 mm, 3.297 mm, and 3.285 mm. Therefore, the imaging lens 10 of each of the above embodiments satisfies a conditional expression:

$$1.21 < \frac{FL5}{EFL} < 1.39$$

where FL5 is the focal length of the fifth lens element 5, and EFL is the effective focal length of the imaging lens 10.

The imaging lens 10 of each of the above embodiments satisfies a conditional expression:

$$0.295 < \frac{G12 + T2 + G23 + T3 + T4 + G45}{TTL} < 0.342$$

where G12 is the gap between the first lens element 1 and the second lens element 2 on the optical axis I, G23 is a gap between the second lens element 2 and the third lens element 3 on the optical axis I, G45 is a gap between the fourth lens element 4 and the fifth lens element 5 on the optical axis I, T2 is a thickness of the second lens element 2 on the optical axis I, T3 is a thickness of the third lens element 3 on the optical axis I, T4 is a thickness of the fourth lens element 4 on the optical axis I, and TTL is the distance from the object side surface 15 of the first lens element 1 to the image plane 99 on the optical axis I.

The imaging lens 10 of each of the above embodiments satisfies a conditional expression:

$$0.113 < \frac{G56}{TTL} < 0.13$$

where G56 is a gap between the fifth lens element 5 and the sixth lens element 6 on the optical axis I, and TTL is the distance from the object side surface 15 of the first lens element 1 to the image plane 99 on the optical axis I.

The imaging lens 10 of each of the above embodiments satisfies a conditional expression:

$$1.34 \leq \frac{TTL}{ImgH} < 1.5$$

where TTL is the distance from the object side surface 15 of the first lens element 1 to the image plane 99 on the optical axis I, and ImgH is the image height of the imaging lens 10.

In summary, the imaging lens provided by the embodiments of the disclosure includes the cemented lens element formed by the third lens element and the fourth lens element, which can prevent the assembly tolerance between the two lens elements caused by adopting the separate third lens element and fourth lens element. Also, the imaging lens can have good imaging quality.

What is claimed is:

1. An imaging lens, sequentially comprising from an object side to an image side along an optical axis:
    a first lens element, having positive refracting power;
    a second lens element, having negative refracting power;
    a third lens element;
    a fourth lens element, wherein the third lens element and the fourth lens element form a cemented lens element, and the cemented lens element has positive refracting power;
    a fifth lens element, having positive refracting power;
    a sixth lens element, having positive refracting power; and
    a seventh lens element, having negative refracting power, wherein the imaging lens satisfies a conditional expression:

$$-7.07 < \frac{(L2R1) \times (L2R2)}{L2R2 - L2R1} < -5.52$$

where L2R1 is a radius of curvature of an object side surface of the second lens element in an optical axis region, and L2R2 is a radius of curvature of an image side surface of the second lens element in an optical axis region.

2. The imaging lens according to claim 1, wherein the imaging lens further satisfies a conditional expression:

$$2.437 < \frac{(L5R1) \times (L5R2)}{L5R2 - L5R1} < 3.16$$

where L5R1 is a radius of curvature of an object side surface of the fifth lens element in an optical axis region, and L5R2 is a radius of curvature of an image side surface of the fifth lens element in an optical axis region.

3. The imaging lens according to claim 1, wherein the imaging lens further satisfies a conditional expression:

$$4.81 < \frac{(L6R1) \times (L6R2)}{L6R2 - L6R1} < 86.96$$

where L6R1 is a radius of curvature of an object side surface of the sixth lens element in an optical axis region, and L6R2 is a radius of curvature of an image side surface of the sixth lens element in an optical axis region.

4. The imaging lens according to claim 1, wherein the imaging lens further satisfies a conditional expression:

$$0.8 < \frac{(L3R1) + (L4R2)}{(-L3R1) + (L4R2)} < 1.16$$

where L3R1 is a radius of curvature of an object side surface of the third lens element in an optical axis region, and L4R2 is a radius of curvature of an image side surface of the fourth lens element in an optical axis region.

5. The imaging lens according to claim 1, wherein the imaging lens further satisfies a conditional expression:

$$-3.08 < \frac{FL2}{EFL} < -2.5$$

where FL2 is a focal length of the second lens element, and EFL is an effective focal length of the imaging lens.

6. The imaging lens according to claim 1, wherein the imaging lens further satisfies a conditional expression:

$$1.21 < \frac{FL5}{EFL} < 1.39$$

where FL5 is a focal length of the fifth lens element, and EFL is an effective focal length of the imaging lens.

7. The imaging lens according to claim 1, wherein the imaging lens further satisfies a conditional expression:

$$0.295 < \frac{G12 + T2 + G23 + T3 + T4 + G45}{TTL} < 0.342$$

where G12 is a gap between the first lens element and the second lens element on the optical axis, G23 is a gap between the second lens element and the third lens element on the optical axis, G45 is a gap between the fourth lens element and the fifth lens element on the optical axis, T2 is a thickness of the second lens element on the optical axis, T3 is a thickness of the third lens element on the optical axis, T4 is a thickness of the fourth lens element on the optical axis, and TTL is a distance from an object side surface of the first lens element to an image plane on the optical axis.

8. The imaging lens according to claim 1, wherein the imaging lens further satisfies a conditional expression:

$$0.113 < \frac{G56}{TTL} < 0.13$$

where G56 is a gap between the fifth lens element and the sixth lens element on the optical axis, and TTL is a distance from an object side surface of the first lens element to an image plane on the optical axis.

9. The imaging lens according to claim 1, wherein the imaging lens further satisfies a conditional expression:

$$1.34 \le \frac{TTL}{ImgH} < 1.5$$

where TTL is a distance from an object side surface of the first lens element to an image plane on the optical axis, and ImgH is an image height of the imaging lens.

10. The imaging lens according to claim 1, wherein a refractive index Nd of the fourth lens element falls within a range of 1.6 to 1.7.

11. The imaging lens according to claim 1, wherein an Abbe number of the fourth lens element is less than 30.

* * * * *